US012726636B2

(12) United States Patent
Smith-Lacey

(10) Patent No.: US 12,726,636 B2
(45) Date of Patent: Sep. 1, 2026

(54) DECODING A COMPRESSED DATA STRUCTURE

(71) Applicant: Imagination Technologies Limited, Kings Langley (GB)

(72) Inventor: Peter Smith-Lacey, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 118 days.

(21) Appl. No.: 18/587,893

(22) Filed: Feb. 26, 2024

(65) Prior Publication Data

US 2024/0346697 A1 Oct. 17, 2024

(30) Foreign Application Priority Data

Feb. 27, 2023 (GB) ...................................... 2302838
Feb. 27, 2023 (GB) ...................................... 2302841

(51) Int. Cl.
*H04N 19/176* (2014.01)
*G06T 9/00* (2006.01)
*H04N 19/182* (2014.01)

(52) U.S. Cl.
CPC ............. *H04N 19/176* (2014.11); *G06T 9/00* (2013.01); *H04N 19/182* (2014.11)

(58) Field of Classification Search
None
See application file for complete search history.

(56) References Cited

U.S. PATENT DOCUMENTS 6,912,319 B1 6/2005 Barnes et al.
8,559,499 B2 10/2013 Mallat et al.
11,863,765 B2 1/2024 King
(Continued)

FOREIGN PATENT DOCUMENTS

GB 2603559 A 8/2022
GB 2609218 A 2/2023

OTHER PUBLICATIONS

Rainer; "Quantization and Coding, Passage"; Multimedia Communication Technology. 11; Jan. 1, 2004; pp. 445-508.
(Continued)

*Primary Examiner* — Nurun Flora
(74) *Attorney, Agent, or Firm* — Potomac Law Group, PLLC; Vincent M DeLuca

(57) ABSTRACT

Methods and decoding units for decoding a compressed data structure to determine a decoded value. The compressed data structure encodes a set of Haar coefficients for a block of pixels, including a plurality of differential coefficients and a sum coefficient. The compressed data structure includes a set of exponent bits representing exponents of the differential coefficients, a set of sign bits representing signs for the differential coefficients, a set of sum bits representing the sum coefficient. The compressed data structure is unpacked to identify the set of exponent bits, the set of sign bits and the set of sum bits. The identified set of exponent bits is used to determine exponents for the differential coefficients. The identified set of sign bits is used to determine signs the differential coefficients. The identified set of sum bits is used to determine the sum coefficient. The decoded value is determined by determining the result of a weighted sum of the differential coefficients and the sum coefficient for the block of pixels.

20 Claims, 8 Drawing Sheets

(56) References Cited

U.S. PATENT DOCUMENTS

| | | | | |
|---|---|---|---|---|
| 2006/0228031 | A1 | 10/2006 | Hou | |
| 2010/0220783 | A1 | 9/2010 | Mallat et al. | |
| 2012/0014595 | A1* | 1/2012 | Frederiksen | G06T 9/007 382/166 |
| 2014/0133552 | A1* | 5/2014 | Beer-Gingold | H04N 19/13 375/240.03 |
| 2017/0041021 | A1 | 2/2017 | Kärkkäinen et al. | |
| 2019/0134915 | A1* | 5/2019 | Schmidt | G06T 17/00 |
| 2020/0372658 | A1* | 11/2020 | De Winde | G06T 7/11 |
| 2023/0046972 | A1* | 2/2023 | King | H04N 19/182 |
| 2024/0323404 | A1* | 9/2024 | Smith-Lacey | H04N 19/176 |

OTHER PUBLICATIONS

Farghaly, et al., “Floating-point discrete wavelet transform-based image compression on FPGA”, Int. J. Electron. Commun. (2020).

Gamito, et al., “Lossless coding of floating point data with JPEG 2000 Part 10”, In Applications of Digital Image Processing XXVII, vol. 5558. SPIE, 276-287, Nov. 2004.

Mavridis, et al., “Texture Compression using Wavelet Decomposition”, Computer Graphics Forum vol. 31, Issue 7 (Sep. 2012).

Shih, et al., “Memory Reduction by Haar Wavelet Transform for MPEG Decoder”, IEEE Transactions on Consumer Electronics, vol. 45, No. 3,Aug. 1, 1999, pp. 867-873.

Trott, et al., “Wavelets Applied to Lossless Compression and Progressive Transmission of Floating Point Data in 3-D Curvilinear Grids”, Proceedings of the 7th IEEE Visualization Conference, 1996.

Colton, Shane: “Real-Time Wavelet Compression for High Speed Video”, accessed at https://scolton.blogspot.com/2019/10/real-time-wavelet-compression-for-high.html on May 2, 2026, published Oct. 27, 2019.

Mathen, Sarin George: “Wavelet transform based Adaptive Image Compression on FPGA”, Masters Thesis, M.S. Computer Engineering, University of Kansas, Jun. 23, 2000.

* cited by examiner

DECODING A COMPRESSED DATA STRUCTURE

CROSS-REFERENCE TO RELATED APPLICATIONS

This application claims foreign priority under 35 U.S.C. 119 from United Kingdom patent application Nos. 2302838.4 and 2302841.8, both filed on 27 Feb. 2023, and which are incorporated by reference herein in their entirety.

FIELD

The present disclosure relates to techniques for encoding a block of pixels into a compressed data structure and/or for decoding a compressed data structure to determine a decoded value. The block of pixels may be part of a texture or other image within a computer graphics system.

BACKGROUND

In computer graphics, texturing is frequently used by a graphics processing unit (GPU) to add surface detail to objects within a scene to be rendered. Textures are typically stored as images, which are accessed to return a colour value for a pixel being processed. To obtain a texture colour value for a pixel, the values of multiple texels of the texture may be sampled, and the sampled texel values may then be filtered to obtain a final texture value for the pixel.

Sampling texel values normally involves fetching a block of texels, e.g. a 2×2 quad of texels (or a differently sized and/or shaped block of texels, e.g. a 4×4, an 8×8 or a 16×4 block of texels), from a memory or a cache. As such it can be beneficial to encode (or "compress") the block of texels into a compressed data structure so that it uses less space in the memory or cache, and so that the amount of data that is transferred between the memory and the GPU (i.e. the "memory bandwidth") is reduced. The GPU can decode a compressed data structure (using a decoding technique that is complementary to the encoding technique used to encode the block of texels into the compressed data structure) to determine a decoded value, e.g. a decoded texture value which can be applied to geometry for a pixel.

A decoded value may represent one of the texels of the block of texels. Decoded values may be determined which represent multiple (e.g., all) of the texels of the block of texels. In this way, the encoding and decoding process can perform compression and decompression of a block of texels.

Furthermore, typically a single pixel of an image being rendered does not map exactly to a single texel of the texture due to the projection of the texture onto 3D geometry within the image. For example, for textured pixels depicting a relatively close view of the texture, each pixel may be associated with a footprint which maps onto a relatively small region of a texture, e.g., covering zero or one texel, whereas for textured pixels depicting a relatively far view of the texture, each pixel may be associated with a footprint which maps onto a relatively large region of a texture, e.g., covering many (e.g., two or more) texels.

In some situations, anisotropic texture filtering may be performed. Anisotropic texture filtering recognises that the sampling rate of the texture, which depends on the mapping from screen-space (in which the image is depicted and the pixel coordinates defined) to texture space (in which the texture is depicted and the texel coordinates defined), is a function of the direction of travel in screen space. In other words, the optimal texture sampling rate may be different along different directions of travel, or axes, in screen space. When this is the case, the mapping between screen space and texture space may be said to be anisotropic. An example of an anisotropic mapping is the 3D projection of planar texture surfaces near the horizon, or any other situation in which a texture is applied to a surface in the scene that is significantly angled away from the viewpoint, e.g., near a silhouette edge of an object.

For anisotropic texture mappings, a sampling kernel in texture space mapped to a pixel in screen space is elongated along a certain axis in texture space, with the direction of this axis being dependent on the mapping between screen space and texture space. This is illustrated schematically in FIG. 1, which shows an image 100 formed of pixels having coordinates defined in image space, and a texture 102 formed of texels having coordinates defined in texel space. Image 100 includes an object 104 having surface detail specified by the texture 102, i.e. the texture 102 is mapped to the surface of the object 104. Remaining objects within the image 100 have been omitted for the purposes of clarity. Object 104 is at an oblique viewing angle within the image 100. As mentioned above, if a texture is applied to geometry which is at an oblique angle relative to the viewing direction (i.e. if a texture is applied to a surface whose normal vector is significantly far from parallel with the viewing direction vector), then an isotropic footprint for a pixel in image space maps to an anisotropic footprint in texture space. Consequently, the circular shape of the footprint of a texture-mapped pixel within the image 100 is not maintained in the mapping to texture space. Numeral 106 denotes the pixel footprint in image space, which is circular, and numeral 108 denotes the corresponding pixel footprint in texel space, which is oval-shaped. It can be seen that the footprint has been elongated in texture space to form an ellipse such that it is anisotropic. In general, the mapping of a pixel with a circular footprint in image space to texture space can be approximated by an ellipse, insofar as the texture mapping itself can be approximated by an affine mapping (i.e., comprising both a linear scaling/rotation and a translation) at the pixel's origin. Here, it is noted that the term 'footprint' as used with respect to pixels does not necessarily refer to the physical shape of the pixel in a display device, but may refer to the area of a pixel filter used to construct the final pixel value for that pixel (which is generally larger than the physical pixel shape). The pixel's footprint in texture space may therefore be said to be equivalent to the sampling kernel in texture space for the pixel; i.e. the footprint in texture space identifies the texels to be sampled and filtered to form the texture colour value for the pixel.

It is generally considered acceptable for the texture encoding and decoding process to be a lossy process, i.e. when a texture is encoded and then decoded, some information may be lost. By allowing the texture encoding and decoding process to be lossy, the textures can be compressed to far greater extents than lossless compression, such that the memory storage and memory bandwidth requirements can be reduced. There are generally three competing aims for the encoding/decoding process: (i) it is beneficial for the amount of data used to represent the encoded texture to be reduced, (ii) it is beneficial for any artefacts introduced by the encoding and decoding process to be minimal, and (iii) it is beneficial for the encoding and decoding processes to be cheap to implement (e.g. in terms of processing latency, power consumption and/or silicon area). Typically, improving one of these three factors will be to the detriment of one or both of the other factors. When combined with texture filtering, these costs may be compounded. For example, high quality texture filtering (such as would minimise sampling artefacts) is typically expensive, both in terms of memory bandwidth and throughput requirements.

Another context in which it is useful to encode and/or decode blocks of pixels is for compressing images, e.g., for compressing images that have been rendered by a graphics processing unit (GPU). This process may be referred to as frame buffer compression and/or frame buffer decompression. Compressing images reduces the amount of data that is used to represent those images, which can be useful in terms of reducing the amount of memory that is used to store the images and in terms of reducing the amount of data that is transferred between a processing unit (e.g. a GPU) and a memory. This can lead to reductions in latency, power consumption and silicon area. With a frame buffer compression/decompression technique filtering tends not to be applied, and normally the decompressed values are intended to be similar to (or exactly the same as) the original values prior to being compressed. For example, if the compression/decompression technique is lossless then the decompressed values will be the same as the original values prior to compression, whereas if the compression/decompression technique is lossy then the decompressed values might not be exactly the same as (but they are an approximate representation of) the original values prior to compression. A lossy compression scheme that achieves a high level of decompressed quality may be described as a "visually/perceptibly lossless" lossy compression scheme. One benefit of lossy compression over lossless compression, aside from achieving better compression rates, is that it can guarantee a fixed worst-case bit rate (as opposed to just an expected bit rate for lossless compression, which is necessarily variable rate).

The UK patent application published as GB2603559 discloses a method of encoding a block of pixels into a compressed data structure by determining a set of Haar coefficients for a 2×2 quad of pixels of the block of pixels, and storing data in the compressed data structure to represent the set of Haar coefficients.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of decoding a compressed data structure to determine a decoded value in accordance with system parameters in a computer system, wherein the compressed data structure encodes a set of Haar coefficients for a block of pixels, wherein the set of Haar coefficients comprises a plurality of differential coefficients and a sum coefficient,

- wherein a first portion of the compressed data structure comprises a set of exponent bits representing exponents for the differential coefficients, a second portion of the compressed data structure comprises a set of sign bits representing signs for the differential coefficients, and a third portion of the compressed data structure comprises a set of sum bits representing the sum coefficient, wherein the numbers of bits in the first, second and third portions of the compressed data structure are in accordance with the system parameters,
- wherein the method comprises:
  - unpacking the compressed data structure to identify the set of exponent bits, the set of sign bits and the set of sum bits;
  - using the identified set of exponent bits to determine exponents for the differential coefficients;
  - using the identified set of sign bits to determine signs for one or more of the differential coefficients;
  - using the identified set of sum bits to determine the sum coefficient;
  - determining the decoded value by determining the result of a weighted sum of the differential coefficients and the sum coefficient for the block of pixels using: (i) the determined exponents for the differential coefficients, (ii) the determined signs for said one or more of the differential coefficients, (iii) the determined sum coefficient, and (iv) respective weights for the differential coefficients and the sum coefficient; and
  - outputting the determined decoded value.

One or more of the system parameters may define the number of exponent bits in the set of exponent bits.

Said unpacking the compressed data structure may comprise:

- reading the first portion of the compressed data structure and determining how many of the differential coefficients are non-zero based on the set of exponent bits; and
- determining the number of sign bits in the set of sign bits to be equal to the number of the differential coefficients that are non-zero.

Said unpacking the compressed data structure may further comprise determining the number of sum bits in the set of sum bits using: (i) one or more of the system parameters, and (ii) the determined number of sign bits in the set of sign bits.

A fourth portion of the compressed data structure may comprise a set of mantissa bits representing mantissas for the differential coefficients, wherein the number of bits in the fourth portion of the compressed data structure may be in accordance with the system parameters, and wherein said unpacking the compressed data structure may identify the set of mantissa bits. The method may further comprise using the identified set of mantissa bits to determine mantissas for one or more of the differential coefficients, and said determining the decoded value by determining the result of a weighted sum of the differential coefficients and the sum coefficient for the block of pixels may further use the determined mantissas for said one or more of the differential coefficients.

Said unpacking the compressed data structure may further comprise determining the number of mantissa bits in the set of mantissa bits using: (i) one or more of the system parameters, (ii) the determined number of sign bits in the set of sign bits, and (iii) the determined number of sum bits in the set of sum bits.

For encoding the block of pixels, the compressed data structure may include only the set of exponent bits in the first portion, the set of sign bits in the second portion, the set of sum bits in the third portion and the set of mantissa bits in the fourth portion, such that the number of bits in the compressed data structure, N, equals a sum of the number of exponent bits in the set of exponent bits, the number of sign bits in the set of sign bits, the number of sum bits in the set of sum bits, and the number of mantissa bits in the set of mantissa bits.

Said determining the decoded value by determining the result of a weighted sum of the differential coefficients and the sum coefficient for the block of pixels may comprise determining the differential coefficients using the determined exponents and signs for the differential coefficients.

Said determining the differential coefficients may further use the determined mantissas for the differential coefficients.

Said determining the decoded value may comprise performing a binary right shift on the result of the weighted sum by 2 binary places to thereby divide the result of the weighted sum by 4, wherein rounding may be applied to determine the decoded value.

Said determining the result of a weighted sum of the differential coefficients and the sum coefficient for the block of pixels may comprise:

- performing a binary shift of the weights in accordance with the determined exponents for a respective one or more of the differential coefficients which are non-zero; and
- summing the determined sum coefficient and the shifted weights in accordance with the determined signs for the respective one or more of the differential coefficients which are non-zero.

The respective weights for the differential coefficients may be predetermined, and the decoded value may represents a value at a pixel position of one of the pixels of the block of pixels.

All of the weights for the differential coefficients may have a magnitude of 1.

The block of pixels may be a 2×2 quad of pixels, and four decoded values may be determined for the respective four pixels of the 2×2 quad of pixels by determining the results of four weighted sums of the differential coefficients and the sum coefficient for the block of pixels, wherein each of the four weighted sums may use a respective set of weights for the differential coefficients, and wherein the sets of weights may be set such that the four decoded values represent values at the four pixel positions of the 2×2 quad of pixels.

The method may further comprise determining the respective weights for the differential coefficients, wherein the weights may be determined based on one or more of:

- a position, relative to the block of pixels, that the decoded value is to be determined for;
- an indication of a level of detail to be provided by the decoded value; and
- an indication of an amount and/or direction of anisotropy to be provided by the decoded value.

The block of pixels may be a block of 4 pixels, e.g. a 2×2 quad of pixels.

The block of pixels may be a 2×2 quad of pixels, and the plurality of differential coefficients may comprise three directional differential coefficients, respectively indicating a horizontal differential, a vertical differential and a diagonal differential in the 2×2 quad.

The system parameters may be set prior to receiving the compressed data structure.

The system parameters may be read from registers in the computer system.

The computer system may be hardcoded to operate in accordance with the set of system parameters.

Each pixel in the block of pixels may be represented with an n-bit pixel value, wherein n may be one of the system parameters. The compressed data structure may have N bits, wherein N may be one of the system parameters.

The system parameters may comprise a plurality of configurable system parameters and a plurality of dependent system parameters which are determined based on one or more of the configurable system parameters. The configurable system parameters may be:

- the number of bits, n, representing the pixel value of each of the pixels in the block of pixels;
- the number of bits, N, in the compressed data structure;
- a minimum and a maximum number of sum bits in the set of sum bits, $D_{min}$ and $D_{max}$;
- a minimum and a maximum exponent value for a first of the differential coefficients $e_{x,min}$ and $e_{x,max}$;
- a minimum and a maximum exponent value for a second of the differential coefficients $e_{y,min}$ and $e_{y,max}$; and
- a minimum and a maximum exponent value for a third of the differential coefficients $e_{xy,min}$ and $e_{xy,max}$.

The dependent system parameters may be:

- a number of exponent bits in the set of exponent bits, E, if exponent compaction is not applied;
- a number of exponent bits in the set of exponent bits, E', if exponent compaction is applied;
- a difference, ΔE, between E and E';
- a number of bits, F, of the compressed data structure that are allocated after the exponent bits and the minimum number of sum bits have been allocated, if exponent compaction is not applied; and
- a number of bits, F', of the compressed data structure that are allocated after the exponent bits and the minimum number of sum bits have been allocated, if exponent compaction is applied.

The number of sign bits in the set of sign bits may be equal to the number of the differential coefficients which are non-zero, and said using the identified set of sign bits to determine signs for said one or more of the differential coefficients may comprise, for each of the differential coefficients which is non-zero, determining that the sign of the differential coefficient is positive if a respective sign bit is set to a first value and determining that the sign of the differential coefficient is negative if a respective sign bit is set to a second value.

The pixel values of the pixels of the block may be in an unsigned format, and said using the identified set of sum bits to determine the sum coefficient may comprise mapping the sum bits to a sum value from a sequence of representable sum values whilst operating in an odd mode in which there is an odd number of steps between consecutive representable sum values from the smallest representable sum value to the largest representable sum value in the sequence.

The pixel values of the pixels of the block may be in a signed format, and said using the identified set of sum bits to determine the sum coefficient may comprise mapping the sum bits to a sum value from a sequence of representable sum values whilst operating in an even mode in which there is an even number of steps between consecutive representable sum values from the smallest representable sum value to the largest representable sum value in the sequence.

Said using the identified set of exponent bits to determine exponents for the differential coefficients may comprise:

- determining an encoded representation of an exponent value, $Exp_i$, for each of the differential coefficients, $\delta_i$; and
- setting the exponent value, $e_i$, for each of the differential coefficients to be equal to $Exp_i-1+e_{i,min}$,
- wherein $e_{i,min}$ is one of the system parameters and indicates a minimum exponent value for the differential coefficient $\delta_i$.

If an encoded representation of the exponent value, $Exp_i$, for a differential coefficient, $\delta_i$, is zero, it may be determined that that differential coefficient is zero.

The number of exponent bits in the set of exponent bits may be less than a sum of the numbers of bits in the encoded representations of the exponent values for the differential coefficients, and said determining an encoded representation of an exponent value, $Exp_i$, for each of the differential coefficients, $\delta_i$, may comprise decompacting the set of exponent bits into the encoded representations of the exponent values.

Each pixel in the block of pixels may have a channel value in a plurality of channels, and the method may comprise performing channel recorrelation on the decoded value.

Said plurality of channels may comprise Red, Green and Blue channels. The plurality of channels may further comprise an Alpha channel.

There is provided a decoding unit configured to decode a compressed data structure to determine a decoded value in accordance with system parameters in a computer system, wherein the compressed data structure encodes a set of Haar coefficients for a block of pixels, wherein the set of Haar coefficients comprises a plurality of differential coefficients and a sum coefficient,

- wherein a first portion of the compressed data structure comprises a set of exponent bits representing exponents for the differential coefficients, a second portion of the compressed data structure comprises a set of sign bits representing signs for the differential coefficients, and a third portion of the compressed data structure comprises a set of sum bits representing the sum coefficient, wherein the numbers of bits in the first, second and third portions of the compressed data structure are in accordance with the system parameters,
- wherein the decoding unit comprises:
  - an unpacking unit configured to unpack the compressed data structure to identify the set of exponent bits, the set of sign bits and the set of sum bits;
  - a coefficient decoding module configured to:
    - use the identified set of exponent bits to determine exponents for the differential coefficients;
    - use the identified set of sign bits to determine signs for one or more of the differential coefficients; and
    - use the identified set of sum bits to determine the sum coefficient; and
  - a decoded value determination module configured to:
    - determine the decoded value by determining the result of a weighted sum of the differential coefficients and the sum coefficient for the block of pixels using: (i) the determined exponents for the differential coefficients, (ii) the determined signs for said one or more of the differential coefficients, (iii) the determined sum coefficient, and (iv) respective weights for the differential coefficients and the sum coefficient; and
    - output the determined decoded value.

A fourth portion of the compressed data structure may comprise a set of mantissa bits representing mantissas for the differential coefficients, wherein the number of bits in the fourth portion of the compressed data structure may be in accordance with the system parameters, and wherein:

- the unpacking unit may be configured to unpack the compressed data structure to further identify the set of mantissa bits;
- the coefficient decoding module may be configured to use the identified set of mantissa bits to determine mantissas for one or more of the differential coefficients, and
- the decoded value determination module may be configured to determine the decoded value by determining the result of a weighted sum of the differential coefficients and the sum coefficient for the block of pixels further using the determined mantissas for said one or more of the differential coefficients.

There may be provided a method of encoding a block of pixels into a compressed data structure in accordance with system parameters in a computer system, the method comprising:

- receiving the block of pixels;
- determining a set of Haar coefficients for the block of pixels, wherein the set of Haar coefficients comprises a plurality of differential coefficients and a sum coefficient;
- determining a set of exponent bits representing exponents for the differential coefficients, wherein the number of exponent bits in the set of exponent bits is in accordance with the system parameters;
- determining a set of sign bits representing signs for one or more of the differential coefficients, wherein the number of sign bits in the set of sign bits is in accordance with the system parameters;
- determining a set of sum bits representing the sum coefficient, wherein the number of sum bits in the set of sum bits is in accordance with the system parameters;
- packing: (i) the determined set of exponent bits into a first portion of the compressed data structure, (ii) the determined set of sign bits into a second portion of the compressed data structure, and (iii) the determined set of sum bits into a third portion of the compressed data structure; and
- storing the compressed data structure.

There may be provided an encoding unit, for implementation in a computer system, and configured to encode a block of pixels into a compressed data structure in accordance with system parameters, the encoding unit comprising:

- a Haar coefficient determining module configured to determine a set of Haar coefficients for the block of pixels, wherein the set of Haar coefficients comprises a plurality of differential coefficients and a sum coefficient;
- a coefficient encoding module configured to:
  - determine a set of exponent bits representing exponents for the differential coefficients, wherein the number of exponent bits in the set of exponent bits is in accordance with the system parameters;
  - determine a set of sign bits representing signs for one or more of the differential coefficients, wherein the number of sign bits in the set of sign bits is in accordance with the system parameters; and
  - determine a set of sum bits representing the sum coefficient, wherein the number of sum bits in the set of sum bits is in accordance with the system parameters; and
- a packing unit configured to:
  - pack: (i) the determined set of exponent bits into a first portion of the compressed data structure, (ii) the determined set of sign bits into a second portion of the compressed data structure, and (iii) the determined set of sum bits into a third portion of the compressed data structure; and
  - cause the compressed data structure to be stored.

There is provided an encoding unit and a decoding unit configured to perform methods described herein.

The encoding unit/decoding unit may be embodied in hardware on an integrated circuit. There may be provided a method of manufacturing, at an integrated circuit manufacturing system, an encoding unit/decoding unit. There may be provided an integrated circuit definition dataset that, when processed in an integrated circuit manufacturing system, configures the system to manufacture an encoding unit/ decoding unit. There may be provided a non-transitory computer readable storage medium having stored thereon a computer readable description of an encoding unit/decoding unit that, when processed in an integrated circuit manufacturing system, causes the integrated circuit manufacturing system to manufacture an integrated circuit embodying an encoding unit/decoding unit.

There may be provided an integrated circuit manufacturing system comprising: a non-transitory computer readable storage medium having stored thereon a computer readable description of the encoding unit/decoding unit; a layout processing system configured to process the computer readable description so as to generate a circuit layout description of an integrated circuit embodying the encoding unit/decoding unit; and an integrated circuit generation system configured to manufacture the encoding unit/decoding unit according to the circuit layout description.

There may be provided computer program code for performing any of the methods described herein. In other words, there may be provided computer readable code configured to cause any of the methods described herein to be performed when the code is run. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
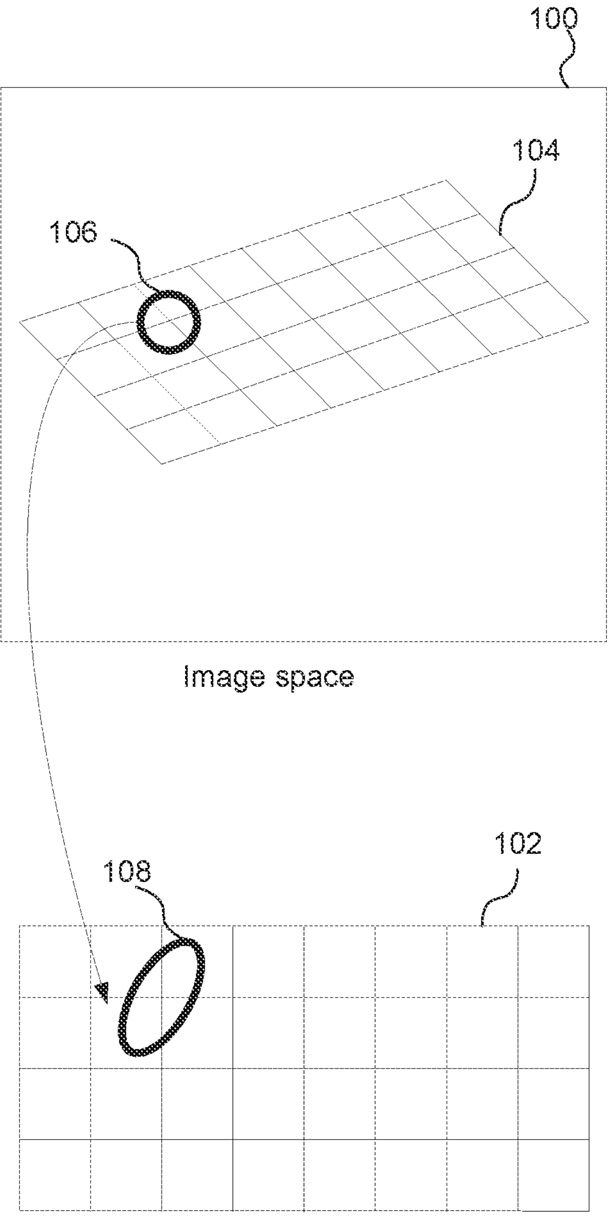
FIG. 1 shows a schematic illustration of a mapping of a sampling kernel between screen space and texture space.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only. The examples described herein provide an encoding unit for encoding a block of pixels (e.g. representing a portion of a texture) using Haar coefficients. Similarly, a decoding unit is provided for decoding a compressed data structure to determine a decoded value (e.g. representing a pixel from the block of pixels) using Haar coefficients. The Haar coefficients comprise a plurality of differential coefficients and a sum coefficient. The examples described herein can cheaply decompose images into downscaled images with directional derivatives (e.g. Haar wavelet coefficients). The compression format is designed to reduce the complexity of reconstructing an image whereby the wavelet coefficients (i.e. Haar coefficients) are independently weighted according to an algorithm that may serve as an implementation of a parametric texture filter that can deliver a range of isotropic and anisotropic filtering automatically as part of the decoding process. The encoding format is simple enough to allow rapid online compression of a small footprint of pixels.

Examples described herein relate to encoding a block of pixels. The block of pixels may be part of a texture, where the "pixels" are the "texels" of the texture. In some other examples, the block of pixels may be part of an image that is being rendered by a graphics processing system, so that the image can be compressed before being written out to a memory. In examples described herein, the terms "pixel" and "texel" refer to one colour value in a (usually) 2D array of single-channel or multi-channel colour values. In examples described herein in which multi-channel colour values are processed, the different channels may be processed separately and the terms "pixel" and "texel" may refer to the values of a single channel of the multi-channel colour values.

Examples are described herein in which an encoding unit in a computer system encodes a block of pixels (e.g. a block of 4 pixels, such as a 2×2 quad of pixels) into a compressed data structure in accordance with system parameters in the computer system. The system parameters are configurable so that the encoding process performed by the encoding unit can be configured to adapt (and the decoding process performed by the decoding unit can adapt accordingly). For example, the pixel values may each have n bits (e.g., a total of 4n bits for a 2×2 quad) and the compressed data structure may have N bits (e.g., where $N<4n$). The values of n and N are two of the system parameters, which can be set (e.g. by a user or a designer of the system) thereby allowing the encoding unit (and the decoding unit) to be configured for use with pixel values having different numbers of bits (aka different bit widths) and allowing different compression ratios to be achieved (by setting the value of N accordingly in the system parameters). The flexibility in terms of the number of bits in the input values and in terms of the compression ratio is not possible in the system disclosed in GB2603559 mentioned in the background section above. As described in more detail below, the system parameters can also define how the bits in the compressed data structure are assigned to different types of data, e.g. to the sum coefficients, to exponents of the differential coefficients or to mantissas of the differential coefficients. In order to achieve these benefits in flexibility, in the techniques described herein the compressed data structure has distinct portions for a set of sum bits representing the sum coefficient, a set of exponent bits representing exponents for the differential coefficients, (possibly) a set of sign bits representing signs for one or more of the differential coefficients, and optionally a set of mantissa bits representing mantissas for one or more of the differential coefficients. Storing these sets of bits in distinct portions in the compressed data structure means that it is simple to adjust the sizes of the different portions of data without significantly changing the principles by which the encoding or decoding techniques operate. The sizes of the different portions of data in the compressed data structure are in accordance with the system parameters.

The system parameters are set prior to receiving a block of pixels. The system parameters could be stored (e.g., in registers) that the encoding unit and the decoding unit can access, i.e., read. Alternatively, the system parameters may be hardcoded into the hardware (e.g. fixed function circuitry) of the encoding unit and the decoding unit during manufacture. Hardcoding the system parameters into the hardware avoids using up register space to store the system parameters, and may provide a more efficient system (in terms of reduced latency), but storing the system parameters (e.g., in registers) allows for greater flexibility as the values of the system parameters could be altered after manufacture (e.g., in response to a change in the input data format, or a change in the required compression rate, i.e., the size of the output compressed data structure). The system parameters could even be altered on the fly e.g., due to a change in format, and there may be a “timestamp” or other “tag” (e.g., encoding a particular input data format) stored with the system parameters so that the decoding unit could determine which were the correct system parameters to use for decoding a given compressed data structure. In some examples, there may be multiple sets of system parameters (either stored (e.g., in registers) or hardcoded into different bits of circuitry), wherein the encoding unit and the decoding unit can select one of the sets (the same set as each other) of systems parameters for use in encoding and decoding blocks of pixels. This allows the same system to be used for encoding blocks of pixels having different formats (e.g., different numbers of bits per pixel value, such as 8-bit pixel values or 10-bit pixel values, etc.) and/or to encode the block of pixels into compressed data structures of different sizes (i.e., to achieve different compression ratios, e.g., 25%, 50% or 75%, or different bit rates, e.g., 4 or 8 bits per pixel value).

The encoding methods described herein can be implemented efficiently (e.g., in terms of processing latency, power consumption and/or silicon area). Furthermore, the encoding methods encode the data in the compressed data structure in a format such that the decoding of the compressed data structure to determine a decoded block of pixels can be performed efficiently (e.g. in terms of processing latency, power consumption and/or silicon area). Furthermore, the encoding and decoding methods described herein have predictable latency and/or power consumption. In other words, the difference between the best case and worst case behaviour is very small (e.g., zero), which satisfies one of the criteria of being an effective on-the-fly codec.

Furthermore, as mentioned above, the encoding methods described herein involve determining Haar coefficients for a block of pixels (e.g. a 2×2 quad of pixels) and encoding those Haar coefficients. As described in more detail below, the Haar coefficients for a 2×2 quad of pixels comprise three directional differential coefficients ($\delta_x$, $\delta_y$ and $\delta_{xy}$) and a sum coefficient ($\Sigma$). The directional differential coefficients may also be referred to as ‘delta values’. The sum coefficient may also be referred to as an ‘average coefficient’. The directional differential coefficients allow different levels of detail to be represented in different directions when the compressed data structure is decoded. The decoding process involves representing a decoded block of pixels as the value of the sum coefficient+some differential term, which is determined by performing a weighted sum of the $\delta_x$, $\delta_y$ and $\delta_{xy}$ coefficients. Just representing a pixel quad as the value of the sum coefficient ($\Sigma$) effectively blurs the whole pixel quad (as a 2×2 box filter would) so that details at a spatial frequency higher than that of the pixel quad are lost, but then detail can be added back in using the differential terms, and by selecting the weights of the different differential terms, different levels of detail can be added in different directions. For example, if, in addition to the sum coefficient ($\Sigma$), the horizontal differential coefficient ($\delta_x$) is used to decode a 2×2 quad of pixels (by setting its weight to a non-zero value) but the vertical and diagonal differential coefficients ($\delta_y$ and $\delta_{xy}$) are not used to decode the 2×2 quad of pixels (by setting their weights to zero) then the level of detail in the decoded block of pixels in the horizontal direction will be twice that in the vertical direction. In this example, the decoding process implements anisotropic filtering with an anisotropic ratio of 2 and with the direction of anisotropy along the vertical direction (since the maximum blurring occurs along that axis). By altering the weights applied to the $\delta_x$, $\delta_y$ and $\delta_{xy}$ differential coefficients, the anisotropic ratio and the direction of anisotropy can be varied. In this way, the encoding/decoding process can apply different types of filtering (e.g., in accordance with a desired anisotropic ratio and direction of anisotropy) when decoding a compressed data structure. As another example, if the weights applied to $\delta_x$ and $\delta_y$ are equal magnitude and the weight applied to $\delta_{xy}$ is equal to the product of the weights applied to $\delta_x$ and $\delta_y$ (i.e., the filter is a separable filter) then the decoding unit will operate as an isotropic filter. In particular, when the weights applied to $\delta_x$, $\delta_y$ and $\delta_{xy}$ all have unit magnitude and the sign of the weight applied to $\delta_{xy}$ is the sign of the product of the weights applied to $\delta_x$ and $\delta_y$, then the decoder will reconstruct one of the original 4 pixels in the 2×2 quad i.e. the top left pixel will be recovered if the weights applied to $\delta_x$ and $\delta_y$ are both −1 (with a weight of +1 for $\delta_{xy}$), the top right pixel will be recovered if the weight applied to $\delta_x$ is +1, but the weight applied to $\delta_y$ is −1 (with a weight of −1 for $\delta_{xy}$), the bottom left pixel will be recovered if the weight applied to $\delta_x$ is −1, but the weight applied to $\delta_y$ is +1 (with a weight of −1 for $\delta_{xy}$) and the bottom right pixel will be recovered if the weights applied to $\delta_x$ and $\delta_y$ are both +1 (with a weight of +1 for $\delta_{xy}$). These cases correspond to an isotropic parametric texture filter with parametric Level of Detail (LOD) of zero with sample locations falling on the pixels themselves.

Encoding

Figure 2:
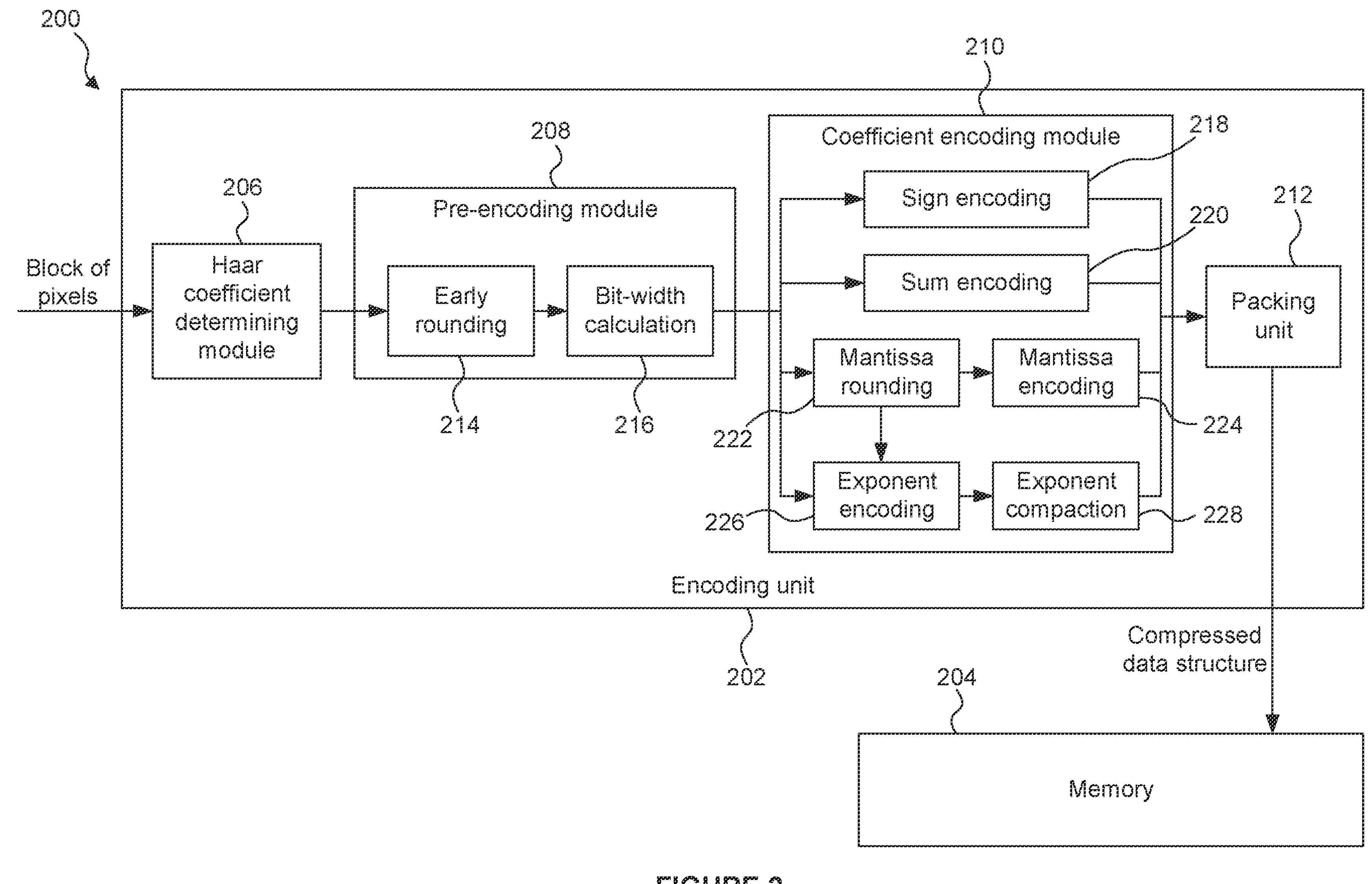
FIG. 2 illustrates a computer system for encoding a block of pixels.

FIG. 2 illustrates an example computer system 200 for encoding a block of pixels. The computer system 200 comprises an encoding unit 202 and a memory 204. The encoding unit 202 comprises a Haar coefficient determining module 206, a pre-encoding module 208, a coefficient encoding module 210 and a packing unit 212. The pre-encoding module 208 comprises early rounding logic 214 and bit-width calculation logic 216. The coefficient encoding module 210 comprises sign encoding logic 218, sum encoding logic 220, mantissa rounding logic 222, mantissa encoding logic 224, exponent encoding logic 226 and exponent compaction logic 228. The components of the encoding unit 202 shown in FIG. 2 may be implemented in hardware (e.g. fixed function circuitry), software, or a combination thereof.

Figure 3:
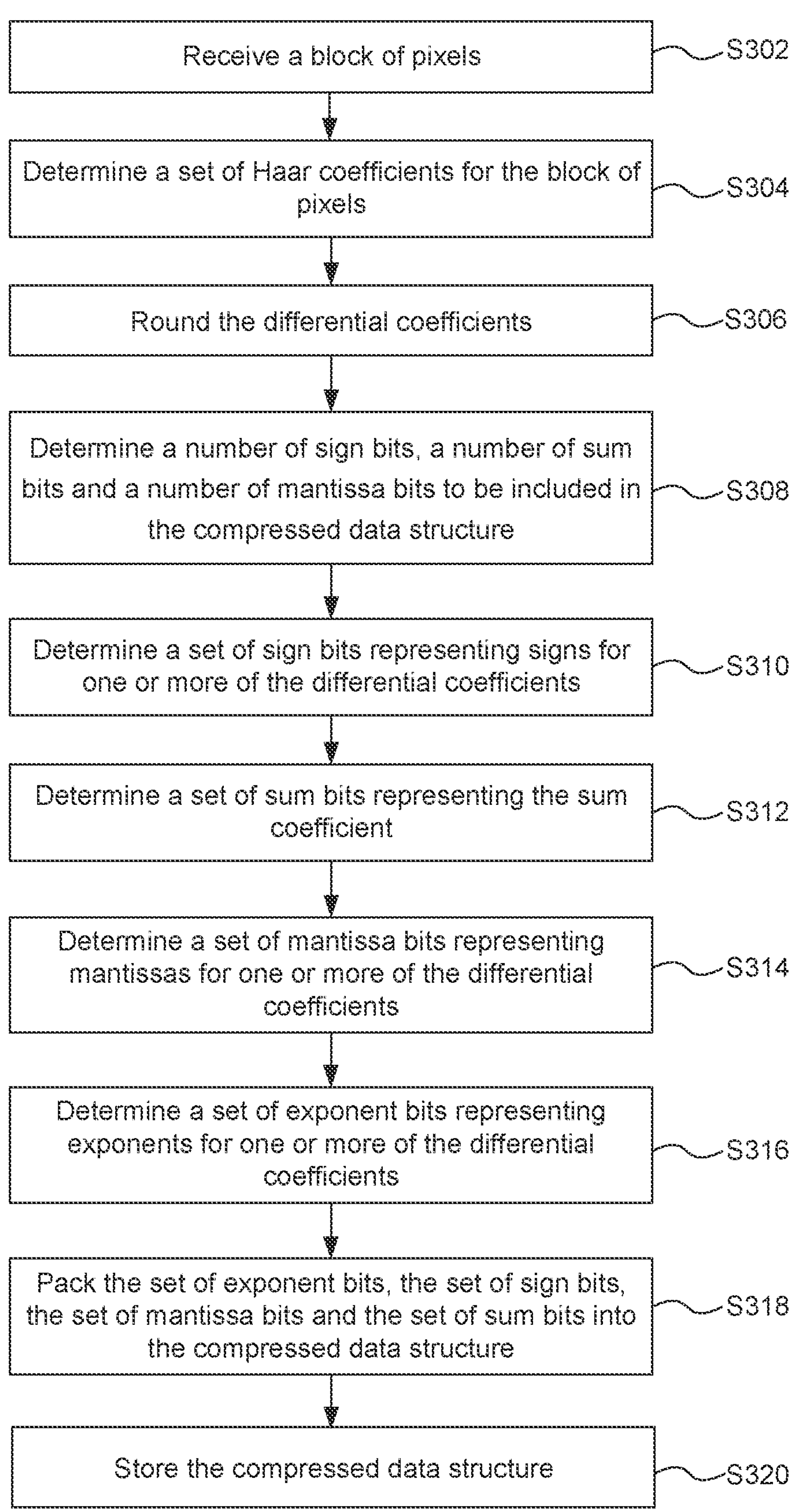
FIG. 3 is a flow chart for a method of encoding a block of pixels into a compressed data structure.

FIG. 3 is a flow chart for a method of encoding a block of pixels into a compressed data structure in accordance with system parameters in the computer system 200. The system parameters determine how the block of pixels is encoded such that the compressed data structure has N bits.

In step S302, the encoding unit 202 (specifically the Haar coefficient determining module 206) receives a block of pixels. In the example described in detail herein the block of pixels is a block (e.g. a contiguous block) of four pixels, specifically it is a 2×2 quad of pixels, but in other examples, the block of pixels may be something other than a 2×2 quad of pixels, e.g. it may be a line of four pixels or it may have a number of pixels other than four, e.g. where the number of pixels is some other power of 2. Other wavelet transforms may be used in other examples, but using the Haar wavelet transform to encode a 2×2 quad of pixels as described in detail herein has many desirable properties, e.g.: (i) the "average value" is the mean of the four pixel values in the quad, (ii) the transform is fixed under any permutation of the pixel values (assuming uniform quantisation of the delta values), and (iii) the transform has horizontal, vertical and diagonal delta values, corresponding to the two first order derivatives and a second order derivative respectively, which can be exploited by filtering techniques. We will first describe an example in which each pixel of a 2×2 quad of pixels comprises a value in a single channel, but as described further below in some examples each pixel in the block of pixels may have a channel value in a plurality of channels (e.g. Red, Green, Blue and Alpha channels). Each single-channel pixel (which is just referred to as a "pixel" below) in the block of pixels is represented with an n-bit pixel value. In some examples n may be 8 or 10.

In step S304 the Haar coefficient determining module 206 determines a set of Haar coefficients for the block of pixels. As described above, the set of Haar coefficients comprises a plurality of differential coefficients ($\delta_x$, $\delta_y$ and $\delta_{xy}$) and a sum coefficient ($\Sigma$).

Figure 4:
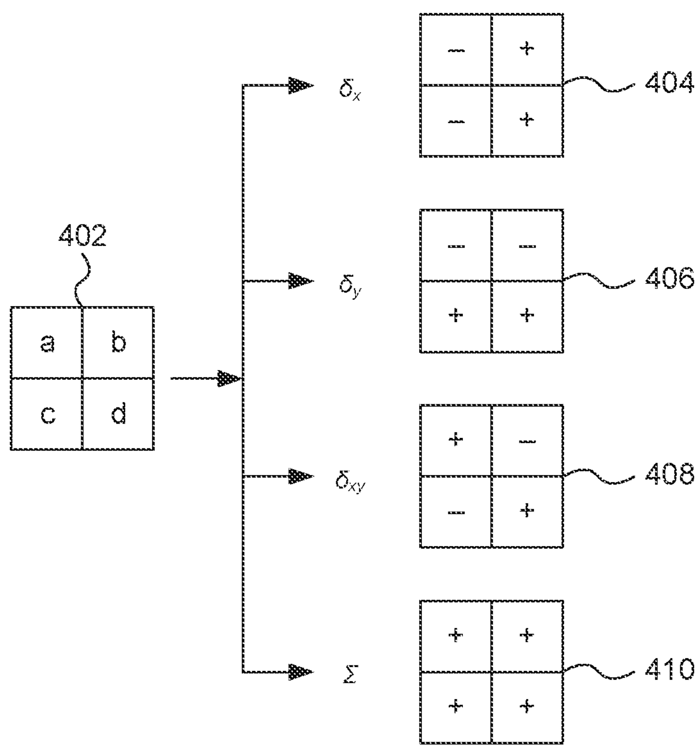
FIG. 4 illustrates how Haar coefficients are determined for a 2×2 quad of pixels.

FIG. 4 illustrates how the Haar coefficients are determined for the 2×2 quad of pixels 402. The quad of pixels 402 comprises pixels with n-bit values a, b, c and d. The set of four n-bit values (a, b, c and d) for a pixel quad is mapped to a set of four (n+2)-bit values ($\Sigma$, $\delta_x$, $\delta_y$ and $\delta_{xy}$). In this example, each of the pixel values (a, b, c and d) is an unsigned integer in the inclusive range $[0, 2^n-1]$. In this example, the sum coefficient ($\Sigma$) is an unsigned integer and the differential coefficients ($\delta_x$, $\delta_y$ and $\delta_{xy}$) are signed integers. Although the differential coefficients are signed integers they are each encoded in a pseudo-floating point format in terms of a sign, a mantissa and an exponent as described below.

As an example, the system parameters may comprise a plurality of (e.g., 10) configurable system parameters and a plurality of (e.g., 5) dependent system parameters which are determined based on one or more of the configurable system parameters. In the main example described herein, the configurable system parameters are:

- The number of bits, n, representing the pixel value of each of the (single-channel) pixels in the block of pixels. As an example, n may be 10.
- The number of bits, N, in the compressed data structure. For example, where the block of pixels has four pixels, N may be set such that $N \le 4n$, so that the encoding process does not expand the number of bits used to represent the block of pixels. As an example, N may be 16.
- A desired minimum and a maximum number of sum bits, $D_{min}$ and $D_{max}$, in a set of sum bits included in the compressed data structure. For example, where the block of pixels has four pixels, the values of $D_{min}$ and $D_{max}$ may be set such that $0 \le D_{min} \le D_{max} \le n+2$. As an example, $D_{min}$ may be 5 and $D_{max}$ may be 6.
- A minimum and a maximum exponent value ($e_{x,min}$ and $e_{x,max}$) for the first of the differential coefficients $\delta_x$. As an example, $e_{x,min}$ may be 6 and $e_{x,max}$ may be 10.
- A minimum and a maximum exponent value ($e_{y,min}$ and $e_{y,max}$) for the second of the differential coefficients $\delta_y$. As an example, $e_{y,min}$ may be 6 and $e_{y,max}$ may be 10.
- A minimum and a maximum exponent value ($e_{xy,min}$ and $e_{xy,max}$) for the third of the differential coefficients $\delta_{xy}$. As an example, $e_{xy,min}$ may be 5 and $e_{xy,max}$ may be 10. The values of $e_{x,min}$, $e_{y,min}$ and $e_{xy,min}$ are very similar, and may be equal (e.g. the difference between any two of these three values might not be greater than 1). Similarly, the values of $e_{x,max}$, $e_{y,max}$ and $e_{xy,max}$ are very similar, and may be equal (e.g. the difference between any two of these three values might not be greater than 1).

It is noted that different combinations of configurable system parameter values may not always be unique, i.e., two distinct sets of values may result in two functionally equivalent systems. Furthermore, in the main example described herein, the dependent system parameters are:

- A number of exponent bits, E, in a set of exponent bits included in the compressed data structure, if exponent compaction is not applied ("exponent compaction" is described below). As an example E may be 9.
- A number of exponent bits, E', in the set of exponent bits included in the compressed data structure, if exponent compaction is applied. As an example E' may be 8.
- A difference, $\Delta E$, between E and E'. As an example $\Delta E$ may be 1.
- A number of bits, F, of the compressed data structure that can be allocated after the exponent bits and the minimum number of sum bits have been allocated, if exponent compaction is not applied. As an example F may be 2.
- A number of bits, F', of the compressed data structure that can be allocated after the exponent bits and the minimum number of sum bits have been allocated, if exponent compaction is applied. As an example F' may be 3.

In accordance with these system parameters, the sum coefficient ($\Sigma$) and the differential coefficients ($\delta_x$, $\delta_y$ and $\delta_{xy}$) are determined such that:

$$\sum = +a+b+c+d$$

$$\delta_x = \text{clamp}\left(-a+b-c+d,\ 1-2^{e_{x,max}+1},\ 2^{e_{x,max}+1}-1\right)$$

$$\delta_y = \text{clamp}\left(-a-b+c+d,\ 1-2^{e_{y,max}+1},\ 2^{e_{y,max}+1}-1\right)$$

$$\delta_{xy} = \text{clamp}\left(+a-b-c+d,\ 1-2^{e_{xy,max}+1},\ 2^{e_{xy,max}+1}-1\right)$$

The clamping in the equations given above for the differential coefficients is to ensure that the values are within valid ranges in accordance with the system parameters so that they can be validly encoded in the bits that are to be included in the compressed data structure.

The horizontal differential coefficient ($\delta_x$) provides an indication of an average change in pixel value across the quad in the horizontal direction. The horizontal differential coefficient ($\delta_x$) is represented as 404 in FIG. 4. The vertical differential coefficient ($\delta_y$) provides an indication of an average change in pixel value across the quad in the vertical direction. The vertical differential coefficient ($\delta_y$) is represented as 406 in FIG. 4. The $\delta_x$ and $\delta_y$ coefficients represent the linear variation of pixel values within the 2×2 quad, i.e., the total derivative. The diagonal differential coefficient ($\delta_{xy}$), or cross derivative, represents the nonlinear variation of pixel values within the 2×2 quad, and can be thought of as a derivative first in x and then in y (hence the notation), or vice-versa. As a second order term, $\delta_{xy}$ does not have a unique direction associated with it (but since it still plays a role in the directional filtering described herein, we refer to it elsewhere in this description as a directional derivative). The $\delta_{xy}$ differential coefficient is represented as 408 in FIG. 4. The sum coefficient ($\Sigma$) represents a sum of the pixel values in the quad. The sum coefficient ($\Sigma$) may be considered to represent an average of the pixel values in the quad (implicitly multiplied by a factor of four). The sum coefficient ($\Sigma$) is represented as 410 in FIG. 4. The values of ($\delta_x$, $\delta_y$ and $\delta_{xy}$) are passed from the Haar coefficient determining module 206 to the pre-encoding module 208 (specifically to the early rounding logic 214).

In step S306 the early rounding logic 214 checks to see whether each of the differential coefficients, $\delta_i$ (for $i \in x$, y, xy), is strictly between zero and the smallest encodable value with the exponent $e_{i,min}$ (if $e_{i,min}$ is not zero), as indicated by one of the system parameters. In response to determining that the differential coefficient, $\delta_i$, is in a range $0<\delta_i<2^{e_{i,min}}$, the early rounding logic 214 rounds the value of $\delta_i$ to either 0 or $2^{e_{i,min}}$. Any suitable type of rounding could be used, e.g., round away from zero, round towards zero, or round to nearest (e.g., round half away from zero, or round half towards zero). For example, if a round to nearest mode is used (e.g., round half away from zero) then $|\delta_i|$ may be rounded to zero if $0 \le |\delta_i| < 2^{e_{i,min}-1}$, and $|\delta_i|$ may be rounded to $2^{e_{i,min}}$ if $2^{e_{i,min}-1} \le |\delta_i| < 2^{e_{i,min}}$. If $e_{i,min}$ is zero then there are no possible values for $\delta_i$ that require rounding. After early rounding (and initial clamping), there are three portions to the range of values that $\delta_i$ can take: (i) a range of negative values not greater than $-2^{e_{i,min}}$ (and strictly greater than $-2^{e_{i,max}+1}$), (ii) zero, (iii) a range of positive values not less than $2^{e_{i,min}}$ (and strictly less than $2^{e_{i,max}+1}$).

Figure 5:
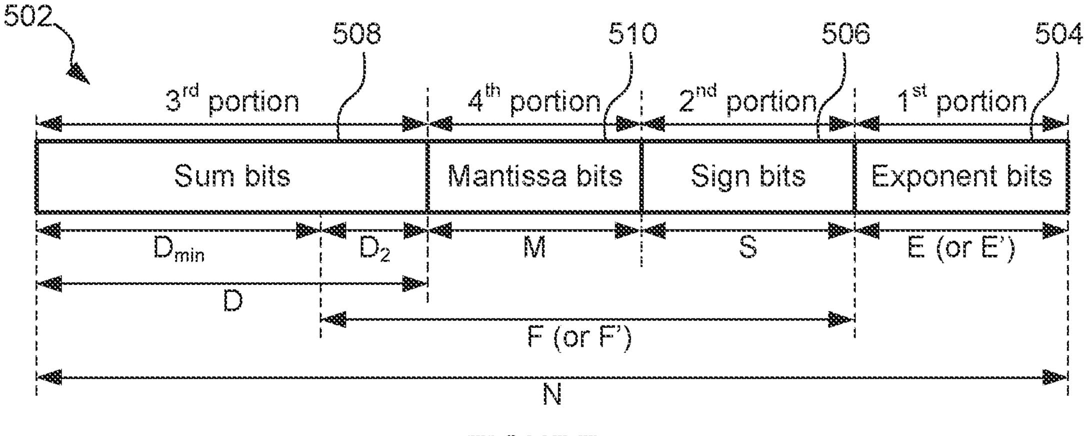
FIG. 5 shows an example format of data in the compressed data structure.

FIG. 5 shows the format of data in a compressed data structure 502. The compressed data structure has N bits. The compressed data structure 502 comprises a plurality of distinct portions for storing different sets of bits. In particular, the compressed data structure 502 comprises: (i) a first portion for storing a set of exponent bits 504 representing exponents for the differential coefficients, (ii) a second portion for storing a set of sign bits 506 representing signs for the differential coefficients, (iii) a third portion for storing a set of sum bits 508 representing the sum coefficient, and (iv) a fourth portion for storing a set of mantissa bits 510 representing mantissas for the differential coefficients. The numbers of bits in the first, second, third and fourth portions of the compressed data structure are in accordance with the (configurable and/or dependent) system parameters. In particular, the number of exponent bits in the set of exponent bits is denoted E (or E' if exponent compaction is used as described below), the number of sign bits in the set of sign bits is denoted S, the number of mantissa bits in the set of mantissa bits is denoted M, and the number of sum bits in the set of sum bits is denoted D. One of the (configurable) system parameters ($D_{min}$) indicates a minimum number of sum bits for the set of sum bits, and these are the most significant bits (MSBs) of the sum bits. Depending on the block of pixels being encoded and the values of one or more of the (configurable and/or dependent) system parameters, there may also be some extra sum bits (the least significant bits (LSBs) of the sum bits), which are denoted $D_2$ in FIG. 5. So, the total number of sum bits in the set of sum bits, D, is given as $D=D_{min}+D_2$. In examples described herein, for encoding the block of pixels 402, the compressed data structure 502 includes only the determined set of exponent bits 504, the determined set of sign bits 506, the determined set of sum bits 508 and the determined set of mantissa bits 510, such that the number of bits in the compressed data structure, N, equals a sum of the number of exponent bits E (or E') in the set of exponent bits 504, the number of sign bits S in the set of sign bits 506, the number of sum bits D in the set of sum bits 508, and the number of mantissa bits M in the set of mantissa bits 510. However, in some alternative examples, the number of bits in the compressed data structure (N) may be padded up, e.g. to a power-of-two if the compressed data structures are not able to be packed contiguously and/or to store additional data, e.g., flag bits, and in these alternative examples the number of bits in the compressed data structure, N, may be greater than the sum of the number of exponent bits in the set of exponent bits, the number of sign bits in the set of sign bits, the number of sum bits in the set of sum bits, and the number of mantissa bits in the set of mantissa bits.

In examples described herein, one or more of the (dependent) system parameters define the number of exponent bits in the set of exponent bits, E (or E'). Furthermore, one or more of the (configurable) system parameters define the minimum number of sum bits in the set of sum bits, $D_{min}$. These values (E, E' and $D_{min}$) do not depend upon the particular block of pixels being encoded. However, the values of S, $D_2$ and M do depend on the particular block of pixels being encoded, as well as on one or more of the (configurable and/or dependent) system parameters. The number of free bits in the compressed data structure after the E (or E', <E, if exponent compaction is used) exponent bits and the minimum number of sum bits ($D_{min}$) have been allocated is denoted in FIG. 5 as F (or F', >F, if exponent compaction is used). These free bits can be allocated to S, M or $D_2$ as described below. When exponent compaction is not used, $N=E+D_{min}+F$ and $F=D_2+M+S$. When exponent compaction is used, $N=E'+D_{min}+F'$ and $F'=D_2+M+S$.

Depending on the set of (configurable and/or dependent) system parameters, and/or the block of pixels being encoded, in some cases M=0, i.e., there may be zero mantissa bits in the set of mantissa bits (aka the fourth portion), such that the compressed data structure only includes the first, second and third portions. For example, this occurs for all blocks of pixels whenever the (configurable) system parameters satisfy $D_{min}+3+E$ (or E')=N. A constant pixel quad, i.e., one with four equal pixel values, is always an example of such a block of pixels regardless of the (configurable and/or dependent) system parameters. It is also possible for the number of sign bits S in the set of sign bits 506 (in the second portion) to be zero: this occurs when a pixel quad is constant such that $\delta_x=\delta_y=\delta_{xy}=0$.

In step S308 the bit-width calculation logic 216 determines the bit-widths that at least partially depend on the block of pixels. That is, subsequent to receiving the block of pixels, in step S308 the bit-width calculation logic 216 determines a plurality of block-specific parameters in dependence on one or more of the (configurable and/or dependent) system parameters and one or more of the Haar coefficients in the determined set of Haar coefficients. The block-specific parameters comprise: (i) the number of sign bits in the set of sign bits, S, (ii) the number of sum bits in the set of sum bits, D, and (iii) a number of mantissa bits in a set of mantissa bits, M, to be packed into the compressed data structure for the block of pixels.

In particular, in step S308 the bit-width calculation logic 216 determines the number of sign bits, S, in the set of sign bits in accordance with one or more of the system parameters and one or more of the Haar coefficients in the determined set of Haar coefficients. The number of sign bits, S, is calculated using the three differential coefficients $\delta_x$, $\delta_y$ and $\delta_{xy}$. In particular, the number of sign bits, S, is determined to be the number of the differential coefficients $\delta_x$, $\delta_y$ and $\delta_{xy}$ that are non-zero. The number of sign bits, S, in the set of sign bits is in accordance with the (configurable and/or dependent) system parameters in the sense that it is consistent with the values of E (or E'), F (or F'), $D_{min}$ and N, i.e. S≤F (or F' if exponent compaction is applied) where N=E (or E')+F (or F')+$D_{min}$. In other words, the system parameters are set such that S can take any value in the inclusive range [0,3]. Therefore, F (or F') is ≥3, and E (or E'), $D_{min}$ and N are set such that N=$D_{min}$+F (or F')+E (or E') as described above.

Furthermore, in step S308 the bit-width calculation logic 216 determines the number of sum bits in the set of sum bits in accordance with one or more of the (configurable and/or dependent) system parameters and one or more of the Haar coefficients in the determined set of Haar coefficients for the block of pixels. This may involve assigning to $D_2$ as many of the free bits (F or F') that are left after the number of sign bits has been determined, without the number of sum bits, D, (usually) exceeding the system parameter $D_{max}$ that indicates the maximum number of sum bits to be included in the compressed data structure. As mentioned above and shown in FIG. 5, D=$D_{min}$+$D_2$, where $D_{min}$ is one of the system parameters, so step S308 may involve determining $D_2$, where $D_2$ does not (usually) exceed the difference between $D_{max}$ and $D_{min}$. If S>0, and if exponent compaction is not applied, then $D_2$=min(F−S, $D_{max}$−$D_{min}$). If S>0, and if exponent compaction is applied, then $D_2$=min(F'−S, $D_{max}$−$D_{min}$). If S=0, then all three of the differential coefficients ($\delta_x$, $\delta_y$ and $\delta_{xy}$) are zero, and as such there is no need to assign any bits as mantissa bits for the differential coefficients, i.e., M=0. Therefore, any remaining bits of the free bits (F or F') can be allocated to the sum bits, even if this exceeds the maximum parameter, $D_{max}$ (otherwise the bits would simply go to waste). The maximal number of bits the sum value can have is n+2, which can therefore replace $D_{max}$ in the expression for $D_2$. That is, if S=0, and if exponent compaction is not applied, then $D_2$=min (F, n+2−$D_{min}$). If S=0, and if exponent compaction is applied, then $D_2$=min (F', n+2−$D_{min}$). When $D_2$ has been determined then the number of sum bits, D, in the set of sum bits may be determined as D=$D_{min}$+$D_2$.

Furthermore, in step S308 the bit-width calculation logic 216 may determine the number of mantissa bits in the set of mantissa bits in accordance with one or more of the (configurable and/or dependent) system parameters and one or more of the Haar coefficients in the determined set of Haar coefficients for the block of pixels. Any remaining free bits (F or F') that are left after the number of sign bits and the number of sum bits have been determined are used to represent mantissa bits of the three differential coefficients $\delta_x$, $\delta_y$ and $\delta_{xy}$. If exponent compaction is not applied then the number of mantissa bits, M, is given by M=F−S−$D_2$, and if exponent compaction is applied then the number of mantissa bits, M, is given by M=F'−S−$D_2$.

When step S308 has been completed, all of the bit widths have been determined, i.e., the values of E (or E'), S, M and D have been determined in a manner that is in accordance with the (configurable and/or dependent) system parameters and is suitable for the particular block of pixels being encoded. Then the four branches of the pipeline of the coefficient encoding module 210 shown in FIG. 2 can (concurrently) determine (in steps S310 to S316) the values to be included in the four portions of the compressed data structure: the set of exponent bits 504, the set of sign bits 506, the set of sum bits 508, and the set of mantissa bits 510.

In step S310 the coefficient encoding module 210 (in particular the sign encoding logic 218) determines a set of sign bits representing signs for one or more of the differential coefficients. As described above, the number of sign bits, S, in the set of sign bits is the number of the differential coefficients ($\delta_x$, $\delta_y$ and $\delta_{xy}$) that are non-zero. In step S310, for each of the differential coefficients that is non-zero, the sign encoding logic 218 sets a respective sign bit to a first value (e.g., 0) if the differential coefficient is positive, and sets the respective sign bit to a second value (e.g., 1) if the differential coefficient is negative.

In step S312 the coefficient encoding module 210 (in particular the sum encoding logic 220) determines a set of sum bits representing the sum coefficient. In particular, the sum encoding logic 220 quantises the sum coefficient E from having n+2 bits down to a quantised value $\Sigma_{quantised}$ having D bits, such that the sum coefficient Σ goes from a value in a range $[0,2^{n+2}-4]$ to a quantised value $\Sigma_{quantised}$ in a range $[0,2^D-1]$. The sum encoding logic 220 may be able to operate in two modes: an odd mode and an even mode. In the odd mode there is an odd number of steps between consecutive representable sum values from the smallest representable sum value to the largest representable sum value (and therefore an even number of encodings in total); whereas in the even mode there is an even number of steps between consecutive representable sum values from the smallest representable sum value to the largest representable sum value (and therefore an odd number of encodings in total). The odd mode may be considered to be better than the even mode for unsigned input values because it gives a better peak signal-to-noise ratio (PSNR), due to fewer encodings, whereas the even mode may be considered to be better than the odd mode for signed input values where we want to be able to exactly represent the middle value (indicating zero). The middle value does not indicate zero for unsigned formats, so the odd mode may be preferred for unsigned formats due to its better average PSNR.

The quantisation mapping may be achieved by any suitable quantisation technique. A simple quantisation technique is truncation in which some number of LSBs are simply removed. However, truncation often doesn't give good results, for example because the representable input values may not be evenly distributed over the range of representable quantised values, and because the full range of values might not be representable after decoding without introducing error (e.g., decoded values representing absolute white and absolute black might not be representable without introducing error into the decoded values). Another quantisation technique (which tends to give better results than truncation) is performing division by a constant with no remainder, as shown in the equations below. A half unit of least precision (ULP) shift before the division may be used to achieve rounding to the nearest neighbour (e.g., with rounding of half integers towards positive infinity). In other examples, rather than a round to nearest approach, a different rounding mode may be used, e.g., a round up mode or a round down mode.

For example, in the odd mode the quantised sum coefficient $\Sigma_{quantised}$ may be determined such that $$\sum_{quantised}=\left\lfloor\frac{2^D-1}{2^{n+2}-4}\sum+\frac{1}{2}\right\rfloor=\left\lfloor\frac{(2^D-1)\sum+2^{n+1}-2}{2^{n+2}-4}\right\rfloor,$$

where the brackets ⌊ ⌋ represent the floor function. It is noted that since the (unquantised) sum coefficient (Σ) was determined by summing four n-bit values (a, b, c and d), the maximum value it can take is $2^{n+2}-4$ and the maximum value that the D-bit quantised sum coefficient ($\Sigma_{quantised}$) can take is $2^D-1$, which is why the fraction in the first expression is $$\frac{2^D-1}{2^{n+2}-4}.$$

The numerator of the second expression ($(2^D-1)\Sigma+2^{n+1}-2$) can be calculated by simple fixed-point arithmetic, e.g., a combination of shift, add and multiply operations. The division of the numerator by the denominator ($2^{n+2}-4$) could be implemented using a look up table (e.g., when static configurable system parameters are implemented) or by performing a full division operation (e.g., when dynamic configurable system parameters are implemented).

In the even mode, the maximal value of the (unquantised) sum coefficient (Σ) is $2^n-1$ (rescaled by a factor of four). Therefore, the middle value is $2^{(n-1)}-½$ (rescaled by a factor of four). For signed input values it can be useful for the middle value to represent zero, but $2^{(n-1)}-½$ is a not a whole integer. Therefore, a design choice can be made as whether to have $2^{(n-1)}-1$, or $2^{(n-1)}$ (rescaled by a factor of four) represent zero, and in the example shown below the latter (i.e., $2^{(n-1)}$) is chosen as it simplifies the arithmetic slightly. This choice of middle value to represent zero extends the range of the (unquantised) sum coefficient Σ, beyond its actual maximal value, to $2^n$ (rescaled by a factor of four). This corresponds to $2^{(n+2)}$ (without being rescaled by a factor of four), which gives rise to a different denominator in the following equations. Furthermore, in the even mode, the quantised sum coefficient ($\Sigma_{quantised}$) has one fewer representable value than in the odd mode, so the maximum value that the D-bit quantised sum coefficient can take is $2^D-2$. As such, the fraction given as $$\frac{2^D-1}{2^{n+2}-4}$$

in the odd mode above is replaced by the fraction $$\frac{2^D-2}{2^{n+2}}.$$

Therefore, in the even mode the quantised sum coefficient $\Sigma_{quantised}$ may be determined such that $$\sum_{quantised}=\left\lfloor\frac{2^D-2}{2^{n+2}}\sum+\frac{1}{2}\right\rfloor=\left\lfloor\frac{(2^{D-1}-1)\sum+2^n}{2^{n+1}}\right\rfloor.$$

The numerator ($(2^D-1)\Sigma+2^n$) can be calculated by simple fixed-point arithmetic, e.g. a combination of shift, add and multiply operations. The division of the numerator by the denominator ($2^{n+1}$) could be implemented using a look up table (e.g., when static configurable system parameters are implemented) or by performing a full division operation (e.g., when dynamic configurable system parameters are implemented).

In step S314 the coefficient encoding module 210 (in particular the mantissa rounding logic 222 and the mantissa encoding logic 224) determines a set of mantissa bits representing mantissas for one or more of the differential coefficients. It is noted that in some alternative examples, mantissa bits of the differential coefficients might not be determined, so step S314 might not be performed and the coefficient encoding module 210 might not include the mantissa rounding logic 222 and/or the mantissa encoding logic 224. However, in examples described herein the mantissa bits are determined and included in the compressed data structure (if there is space in the compressed data structure for them, i.e., if M>0).

Normally, M will not be large enough to store enough mantissa bits for all of the differential coefficients to be encoded at full precision. In other words, some information is in most cases lost since the number of mantissa bits, M, to be included in the compressed data structure is limited. Only the most important (e.g., most significant) of the mantissa bits are kept. For example, the M mantissa bits are selected from the MSBs (excluding the initial 1) of the magnitudes of the differential coefficients ($|\delta_x|$, $|\delta_y|$ and $|\delta_{xy}|$), e.g., in accordance with the following rules.

1. Select the MSB of the differential coefficients in the more significant place.
2. If bits are equal by rule (1) then select the MSB of the differential coefficient with a smaller exponent.
3. If bits are equal by rules (1) and (2) then use a tie-break condition, e.g., to select the MSB of the differential coefficient given by a predetermined order of precedence, e.g., $\delta_x$ then $\delta_y$ then $\delta_{xy}$.

An example selection of the limited number of M mantissa bits, for the magnitudes of three differential coefficients ($|\delta_x|$, $|\delta_y|$ and $|\delta_{xy}|$) is shown below with M=5 resulting in $M_x=2$, $M_y=2$, and $M_{xy}=1$ given their respective exponent values:

| $|\delta_x|$: | | | |
|---|---|---|---|
| 1 | $M_{x,1}$ | $M_{x,2}$ | +1 |

| $|\delta_y|$: | | | |
|---|---|---|---|
| 1 | $M_{y,1}$ | $M_{y,2}$ | +1 |

| $|\delta_{xy}|$: | | |
|---|---|---|
| 1 | $M_{xy,1}$ | +1 |

In this example, the exponent of $\delta_x$ is 3, the exponent of $\delta_y$ is 4 and the exponent of $\delta_{xy}$ is 3. In accordance with the three rules given above, the five mantissa bits are selected such that:

(i) mantissa bit $M_{y,1}$ is selected first because the MSB of $\delta_y$ (excluding the initial 1) is in a more significant place that the corresponding MSBs (excluding the initial 1) of $\delta_x$ and $\delta_{xy}$ (i.e., rule 1);

(ii) mantissa bit $M_{x,1}$ is selected second following the tie-break condition of rule 3 given above;

(iii) mantissa bit $M_{xy,1}$ is selected third due to rule 2;

(iv) mantissa bit $M_{y,2}$ is selected fourth due to rule 1; and (v) mantissa bit $M_{x,2}$ is selected fifth due to rule 3.

The mantissa rounding logic 222 may add a power-of-two integer at the half ULP position of each absolute differential coefficient value ($|\delta_x|$, $|\delta_y|$ and $\delta_{xy}$) relative to their respective number of encoded mantissa bits (as indicated by "+1" above). If the half ULP position falls in a fractional place, then no rounding occurs for that differential coefficient (even if rounding were applied it would have no effect as the bit in the fractional place would be 0). In the example above, 2 mantissa bits are retained for $|\delta_x|$ and $\delta_y|$, and 1 mantissa bit is retained for $\delta_{xy}$. As the exponent of $|\delta_x|$ is 3, and two of its mantissa bits are to be stored, its half ULP place means 1 is added to the absolute differential coefficient $|\delta_x|$. As the exponent of $|\delta_y|$ is 4, and two of its mantissa bits are to be stored, its half ULP place means 2 is added to the absolute differential coefficient $\delta_y$. As the exponent of $\delta_{xy}$ is 3, and one of its mantissa bits is to be stored, its half ULP place means 2 is added to the absolute differential coefficient $|\delta_{xy}|$.

The rounding operation performed by the mantissa rounding logic 222 may increase the exponent of any of the three absolute differential coefficients deltas ($|\delta_x|$, $|\delta_y|$ and $|\delta_{xy}|$) by 1, and if this is the case then an indication of that is passed to the "Exponents Encoding" logic 226. When an exponent increases, the distribution of mantissa bits may differ between the "Mantissa Rounding" and "Mantissa Encoding" stages, and the determination of how to split the M mantissa bits between the mantissas of the different differential coefficients may be repeated based on the new exponent value. Rule 2 given above (i.e., select an MSB of a differential coefficient with a smaller exponent rather than a larger exponent) means that a second level of rounding would have no effect. Therefore, the three rules given in the example above, do not need to be applied more than twice: once for mantissas rounding, and once for mantissas encoding. It is noted that the mantissa rounding logic 222 and the rounding operation that is performed by it are optional, and some implementations would not include them.

The M mantissa bits that are selected can be included in the set of mantissa bits (to be stored in the fourth portion of the compressed data structure) in any suitable order, so long as the encoding technique and a subsequent decoding technique use the same order as each other. For example, the mantissa bits could be stored as:

| $m_4$ | $m_3$ | $m_2$ | $m_1$ | $m_0$ |
|---|---|---|---|---|

where $m_4=M_{x,1}$, $m_3=M_{x,2}$, $m_2=M_{y,1}$, $m_1=M_{y,2}$ and $m_0=M_{xy,1}$.

In step S316 the coefficient encoding module 210 (in particular the exponent encoding logic 226 and the exponent compaction logic 228) determines a set of exponent bits representing exponents for the differential coefficients. Exponent compaction is an optional feature, so some examples do not include the exponent compaction logic 228, such that the set of exponent bits would include E bits. However, in the main examples described herein exponent compaction logic 228 is included which does perform exponent compaction such that the set of exponent bits includes E' bits. The values of E and E' are two of the (dependent) system parameters.

The exponent encoding logic 226 encodes the exponent of each of the three absolute differential coefficients ($|\delta_x|$, $|\delta_y|$ and $|\delta_{xy}|$). This may be achieved by taking the integer result of the floor of the base-2 logarithm of each absolute differential coefficient, as shown in the following equations to calculate raw exponents $e_x$, $e_y$ and $e_{xy}$. This functionality is described this way for the purpose of expressing it as a mathematical operation only, and other examples may implement this functionality differently. Furthermore, it is noted that 'floor ($\log_2(n)$)' is an integer operation, equivalent to finding the position of the leading 1 in the binary representation of n, which is simple to implement with logic gates. This calculation includes any increment to the results due to mantissas rounding, as indicated by the mantissa rounding logic 222. As described below, if a differential coefficient $\delta_i$ is zero then this is handled as a special case, and is mapped to an exponent of $e_{i,min}-1$. The raw exponents $e_x$, $e_y$ and $e_{xy}$ are determined in accordance with the following equations:

$$e_x = \begin{cases} \lfloor \log_2(|\delta_x|) \rfloor & \text{if } |\delta_x| \neq 0 \\ e_{x,min} - 1 & \text{if } |\delta_x| = 0 \end{cases}$$

$$e_y = \begin{cases} \lfloor \log_2(|\delta_y|) \rfloor & \text{if } |\delta_y| \neq 0 \\ e_{y,min} - 1 & \text{if } |\delta_y| = 0 \end{cases}$$

$$e_{xy} = \begin{cases} \lfloor \log_2(|\delta_{xy}|) \rfloor & \text{if } |\delta_{xy}| \neq 0 \\ e_{xy,min} - 1 & \text{if } |\delta_{xy}| = 0 \end{cases}$$

The raw exponents ($e_x$, $e_y$ and $e_{xy}$) are shifted by a bias of $e_{i,min}-1$ to ensure that the encoded exponents start from zero. After this shift has occurred, the encoded exponents ($Exp_x$, $Exp_y$ and $Exp_{xy}$) fall inside the range representable by the number of exponent states afforded by the configured system in accordance with the system parameters. The shifted encoded exponents are given as:

$$Exp_x = e_x + 1 - e_{x,min} \in [0, e_{x,max} - e_{x,min} + 1]$$

$$Exp_y = e_y + 1 - e_{y,min} \in [0, e_{y,max} - e_{y,min} + 1]$$

$$Exp_{xy} = e_{xy} + 1 - e_{xy,min} \in [0, e_{xy,max} - e_{xy,min} + 1]$$

In other words, in step S316 the exponent encoding logic 226 determines a set of exponent bits by, for each of the differential coefficients, $\delta_i$ (for $i \in x, y, xy$):

if the differential coefficient, $\delta_i$, is zero, setting the exponent value for the differential coefficient to be equal to $e_{i,min}-1$;

if the differential coefficient, $\delta_i$, is non-zero, setting the exponent value for the differential coefficient to be equal to $\lfloor \log_2(|\delta_i|) \rfloor$; and shifting the exponent values of the differential coefficients with a bias of $e_{i,min}-1$ such that the shifted exponent values start from zero, wherein the set of exponent bits represent the shifted exponent values for the differential coefficients. As described above, each $e_{i,min}$ is one of the (configurable) system parameters and indicates a minimum exponent value for the differential coefficient $\delta_i$.

The sum of the bits used to represent each of the exponent values ($Exp_x$, $Exp_y$ and $Exp_{xy}$) is given by the (dependent) system parameter E. In one example, $Exp_x=Exp_y=Exp_{xy}=3$ and E=9. If exponent compaction is not implemented then these bits are simply concatenated and included in the set of E exponent bits 504 to be included in the compressed data structure 502.

However, depending on the allowable ranges of the exponent values (determined by the system parameters $e_{i,min}$ and $e_{i,max}$) simply concatenating the representations of the exponent values ($Exp_x$, $Exp_y$ and $Exp_{xy}$) might not be the most efficient way to represent the exponent values in the set of exponent bits. The exponent compaction logic 228 may reduce the number of bits in the set of exponent bits, e.g., by 1 or 2 bits. For example, exponent compaction may be performed if ΔE is greater than zero. The value of ΔE is one of the (dependent) system parameters, and ΔE=E−E'. Exponent compaction compacts the determined representations of the exponent values ($Exp_y$, $Exp_y$ and $Exp_{xy}$) into the set of exponent bits, such that the number of exponent bits in the set of exponent bits is (assuming ΔE>0) less than the sum of the numbers of bits needed to represent each of the individual determined exponent values. In particular, the set of exponent bits (Exp) may be determined according to:

$$\text{Exp} = \text{Exp}_x(e_{y,max} - e_{y,min} + 2)(e_{xy,max} - e_{xy,min} + 2) + \text{Exp}_y(e_{xy,max} - e_{xy,min} + 2) + \text{Exp}_{xy}.$$

It is noted that steps S310 to S316 could be performed (at least partially) in parallel/concurrently, and/or in any suitable order provided that if the mantissa rounding logic 222 is implemented then it is able to provide its input to the exponent encoding logic 226 in advance.

In step S318 the packing unit 212 packs: (i) the determined set of exponent bits 504 into a first portion of the compressed data structure, (ii) the determined set of sign bits 506 into a second portion of the compressed data structure, (iii) the determined set of sum bits 508 into a third portion of the compressed data structure, and (iv) the determined set of mantissa bits 510 into a fourth portion of the compressed data structure. As mentioned above, the different portions of the compressed data structure are distinct (i.e., non-overlapping). The different portions are generally contiguous. Furthermore, as mentioned above, in some implementations M=0, such that no mantissa bits are stored in the compressed data structure. Also, as mentioned above, it is also possible for the number of sign bits S in the set of sign bits 506 (in the second portion) to be zero: this occurs when a pixel quad is constant such that $\delta_x=\delta_y=\delta_{xy}=0$.

In step S320 the compressed data structure is stored. In particular, the packing unit 212 sends the compressed data structure to the memory 204 for storage therein.

In the examples described above the pixel values relate to a single channel of data, and if the pixel values have channel values in multiple channels then the different channels may be encoded separately, i.e., independently, and the number of input bits (n) in the channel values may be the same or different for the different colour channels and the number of bits (N) in the output compressed blocks may be the same or different for the different colour channels. However, in some other examples, each pixel in the block of pixels may have a channel value in a plurality of channels (e.g., a Red channel, a Green channel, a Blue channel, and sometimes an Alpha channel too), and channel decorrelation may be performed on the non-alpha channel values of the pixels in the block of pixels prior to determining the set of Haar coefficients for the block of pixels. For example, a Green channel may be used as a reference channel, and colour decorrelation may be performed on the Red channel by replacing the pixel values, R(x), for pixel positions, x, in the Red channel with decorrelated values, R'(x), where R'(x)=R(x)−G(x). Furthermore, colour decorrelation may be performed on the Blue channel by replacing the pixel values, B(x), for pixel positions, x, in the Blue channel with decorrelated values, B'(x), where B'(x)=B(x)−G(x).

The colour decorrelation can improve the quality of the encoding (i.e., reduce the amount of information that is lost in the encoding process) particularly if the different channels are highly correlated, e.g., for greyscale images. For example, the number of bits in the compressed data structure may be greater for the reference channel (e.g., the Green channel) than for the non-reference channels (e.g., the Red and Blue channels) on which colour decorrelation has been performed. As an example, N−1 bits may be used for the compressed data structure for each of the Blue and Red channels (which are non-reference channels), and N+2 bits may be used for the compressed data structure for the Green channel (which is the reference channel). If the colour channels are highly correlated (e.g., for near greyscale images) then using N−1 bits for the non-reference channels on which colour decorrelation has been performed will not introduce much (if any) loss of data, and the extra two bits for the compressed data structure for the reference channel can improve the decompressed quality. The ranges of the pixels values in the non-reference channels are doubled by the colour decorrelation process, but this is easily accounted for in the system described herein by simply incrementing the (configurable) system parameter, n, for those channels (i.e., using a configurable system parameter of n+1 for the pixel value bit-width). Additionally for the non-reference channels, the values may be shifted up by $2^n$ so that they are non-negative, or they may be left as signed values. If the values are left as signed values then the encoding of the sum coefficient would be modified accordingly because it would also be a signed value (rather than an unsigned value as described in the examples above). Furthermore, it is noted that, if the values are either shifted up so that they are non-negative or left as signed values then they still represent signed data, and therefore the 'even mode' of the sum coefficient encoding may be preferable so that the middle value (indicating zero) can be represented exactly (as described above).

The encoding processes described above are efficient to implement (e.g., in terms of latency, power consumption and/or silicon area) and are easily adaptable for use with different formats of data or for implementing different compression ratios, e.g., by changing the values of the (configurable) system parameters, such as n and N.

Decoding

We now go on to describe how a compressed data structure 502 representing a block of pixels 402 is decoded to determine a decoded value. As described in more detail below, the decoded value may represent one of the pixels of the block of pixels (e.g., if the encoding and decoding techniques are being used for compression and decompression of the pixel values). Alternatively, the decoded value may represent a filtered value at a position somewhere within a region represented by the block of pixels (e.g., if the encoding and decoding techniques are being used for determining a filtered texture value).

Figure 6:
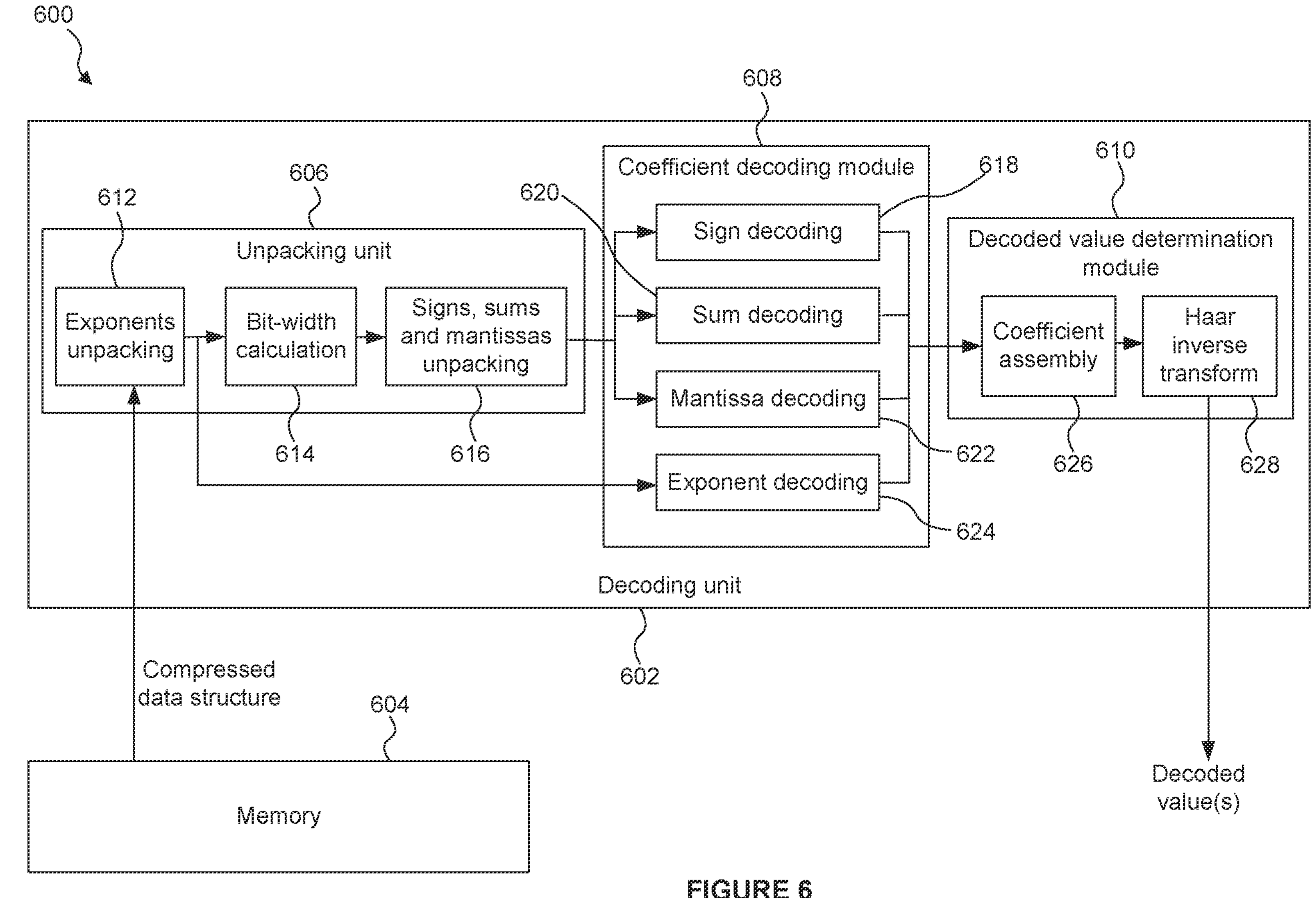
FIG. 6 illustrates a computer system for decoding a compressed data structure.

FIG. 6 illustrates an example computer system 600 for decoding a compressed data structure. The computer system 600 comprises a decoding unit 602 and a memory 604. The memory 604 may be the same as the memory 204 shown in FIG. 2 and described above. The decoding unit 602 comprises an unpacking unit 606, a coefficient decoding module 608 and a decoded value determination module 610. The unpacking unit 606 comprises exponents unpacking logic 612, bit-width calculation logic 614 and signs, sums and mantissas unpacking logic 616. The coefficient decoding module 608 comprises sign decoding logic 618, sum decoding logic 620, mantissa decoding logic 624 and exponent decoding logic 624. The decoded value determination module 610 comprises coefficient assembly logic 626 and Haar inverse transform logic 628. The components of the decoding unit 602 shown in FIG. 6 may be implemented in hardware (e.g., fixed function circuitry), software, or a combination thereof.

Figure 7:
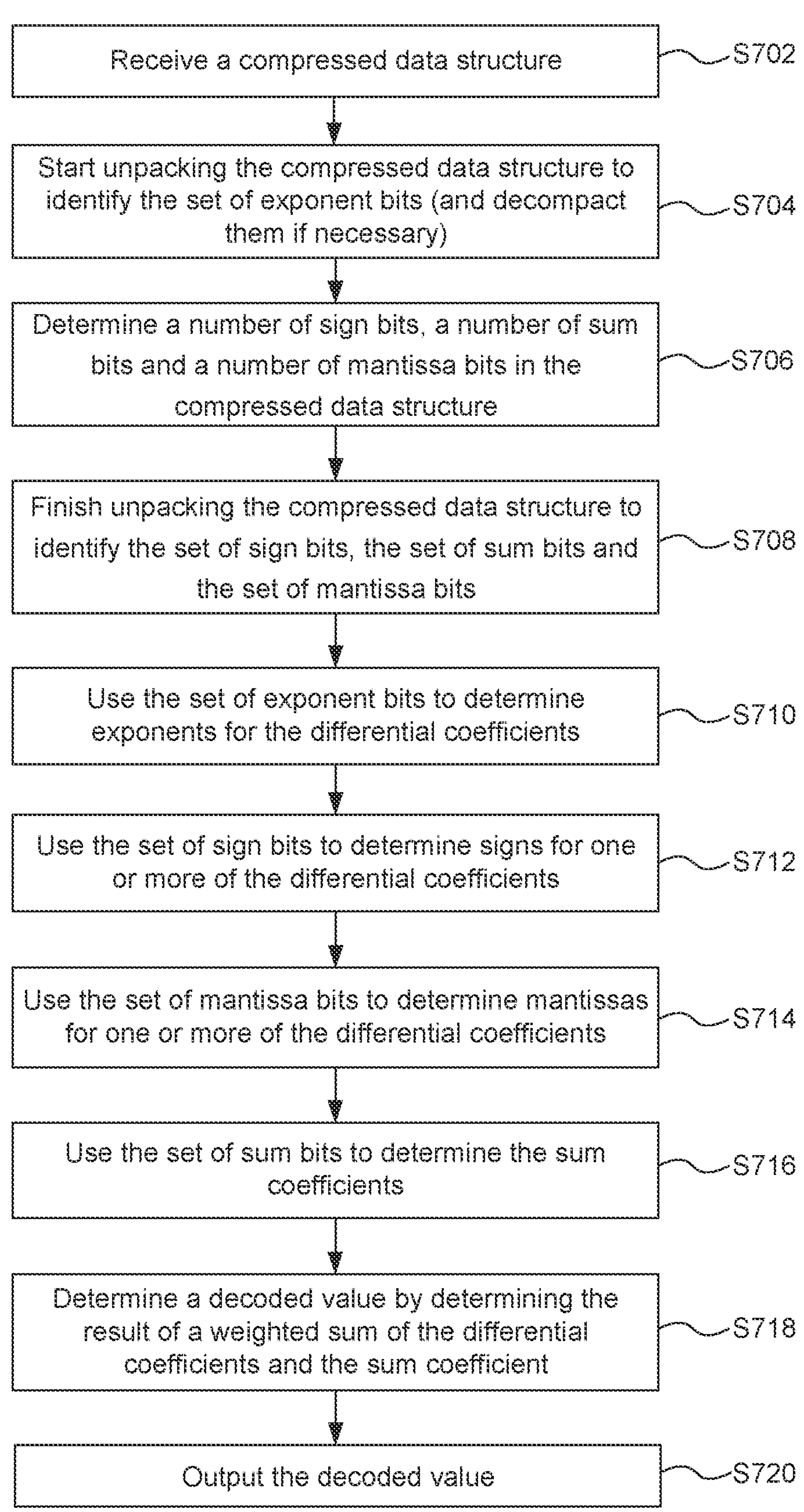
FIG. 7 is a flow chart for a method of decoding a compressed data structure to determine a decoded value.

FIG. 7 is a flow chart for a method of decoding the compressed data structure 502 to determine a decoded value in accordance with (configurable and/or dependent) system parameters in the computer system 600. The decoding unit 602 uses the same (configurable and therefore also dependent) system parameters as those that the encoding unit 202 used to encode the block of pixels into the compressed data structure 502. The (configurable) system parameters are set prior to receiving the compressed data structure. As described above, the (configurable) system parameters could be stored (e.g., in registers) that the decoding unit 602 (and encoding unit 202) can access, i.e., read. Alternatively, the system parameters may be hardcoded into the hardware (e.g., fixed function circuitry) of the decoding unit 602 (and the encoding unit 202) during manufacture. As described above, the system parameters could be altered on the fly e.g., due to a change in format, and there may be a "timestamp" or other "tag" (e.g., encoding a particular input data format) stored with the system parameters so that the decoding unit can determine which are the correct system parameters to use for decoding a given compressed data structure.

In step S702 a compressed data structure is received at the decoding unit 602. In particular, the compressed data structure 502 is received from the memory 604 at the unpacking unit 606 of the decoding unit 602. As described above, the compressed data structure 502 encodes a set of Haar coefficients for a block of pixels, wherein the set of Haar coefficients comprises a plurality of differential coefficients and a sum coefficient. Also as described above, a first portion of the compressed data structure 502 comprises a set of exponent bits 504 representing exponents for the differential coefficients, a second portion of the compressed data structure 502 comprises a set of sign bits 506 representing signs for the differential coefficients, a third portion of the compressed data structure 502 comprises a set of sum bits 508 representing the sum coefficient, and a fourth portion of the compressed data structure 502 comprises a set of mantissa bits 510 representing mantissas for the differential coefficients, wherein the numbers of bits in the first, second, third and fourth portions of the compressed data structure 502 are in accordance with the (configurable and dependent) system parameters. In examples described above, for encoding a block of pixels, the compressed data structure 502 includes only the set of exponent bits 504 in the first portion, the set of sign bits 506 in the second portion, the set of sum bits 508 in the third portion and the set of mantissa bits 510 in the fourth portion, such that the number of bits in the compressed data structure, N, equals a sum of the number of exponent bits in the set of exponent bits, the number of sign bits in the set of sign bits, the number of sum bits in the set of sum bits, and the number of mantissa bits in the set of mantissa bits. However, in some alternative examples, the number of bits in the compressed data structure (N) may be padded up, e.g. to a power-of-two if the compressed data structures are not able to be packed contiguously and/or to store additional data, e.g., flag bits, and in these alternative examples the number of bits in the compressed data structure, N, may be greater than the sum of the number of exponent bits in the set of exponent bits, the number of sign bits in the set of sign bits, the number of sum bits in the set of sum bits, and the number of mantissa bits in the set of mantissa bits. In the examples described below there are some mantissa bits included in the compressed data structure, but as noted above, in some cases there are no mantissa bits in the compressed data structure (i.e., M=0), and there may be no sign bits in the compressed data structure for constant pixel quads (i.e., S=0).

In steps S704, S706 and S708 the unpacking unit 606 unpacks the compressed data structure 502 to identify the set of exponent bits 504, the set of sign bits 506, the set of sum bits 508 and the set of mantissa bits 510, in accordance with the (configurable and dependent) system parameters.

In particular, in step S704 the exponents unpacking logic 612 starts unpacking the compressed data structure 502 to identify the set of exponent bits 504 and decompacts them if they are compacted during the encoding process (i.e., when the dependent system parameter $\Delta E>0$). One or more of the (dependent) system parameters define the number of exponent bits in the set of exponent bits 504. More specifically, the (dependent) system parameters (e.g., E, E' and $\Delta E$) directly indicate the number of exponent bits in the compressed data structure, so the decoding unit 602 does not need to perform any calculation to determine the number of exponent bits in the compressed data structure. If $\Delta E=0$ then exponent compaction was not used in the encoding process so the representations of the three exponents ($Exp_y$, $Exp_y$ and $Exp_{xy}$) are simply read out of the first portion of the compressed data structure 502 and passed to the exponent decoding logic 624. If $\Delta E>0$ then the exponents unpacking logic 612 performs exponent decompaction. In other words, if the number of exponent bits in the set of exponent bits 504 is less than the sum of the numbers of bits in the encoded representations of the exponent values for the differential coefficients, then the exponents unpacking logic 612 determines an encoded representation of an exponent value, $Exp_i$, for each of the differential coefficients, $\delta_i$ (for $i \in x, y, xy$), by decompacting the set of exponent bits, Exp, into the encoded representations of the exponent values. For example, the exponent decompaction may be in accordance with the following equations:

$$Exp_x = \left\lfloor \frac{Exp}{(e_{y,max} - e_{y,min} + 2)(e_{xy,max} - e_{xy,min} + 2)} \right\rfloor$$

$$Exp_y = \left\lfloor \frac{Exp}{(e_{xy,max} - e_{xy,min} + 2)} \right\rfloor (\mathrm{mod}(e_{y,max} - e_{y,min} + 2))$$

$$Exp_{xy} = Exp\ (\mathrm{mod}(e_{y,max} - e_{y,min} + 2))$$

It is noted that the equations given above are just for the clarity of this disclosure, and in practice when the (configurable) system parameters are predetermined some functionally equivalent look up table or logic array may be used to determine the results in accordance with the equations (rather than necessarily performing the calculations as specified in the equations). When the (configurable) system parameters are dynamically determined then the division and/or modulo operations may be fully implemented. When the representations of the exponents ($Exp_y$, $Exp_y$ and $Exp_{xy}$) have been determined they are passed to the exponent decoding logic 624.

In step S706 the bit-width calculation logic 614 determines: (i) a number of sign bits, S, in the set of sign bits 506, (ii) a number of sum bits, D, in the set of sum bits 508, and (iii) a number of mantissa bits, M, in the set of mantissa bits 510.

In particular, in step S706, the bit-width calculation logic 614 uses the representations of the three exponents ($Exp_x$, $Exp_y$ and $Exp_{xy}$) to determine the number of sign bits, S in the set of sign bits 506. In particular, the unpacking unit 606 (e.g. the bit-width calculation logic 614) determines how many of the differential coefficients are non-zero based on the set of exponent bits (i.e., how many of $Exp_y$, $Exp_y$ and $Exp_{xy}$ are non-zero) and determines the number of sign bits, S, in the set of sign bits 506 to be equal to the number of the differential coefficients that are non-zero. As mentioned above, the number of sign bits, S, in the set of sign bits is in accordance with the system parameters in the sense that it is consistent with the values of E (or E'), F (or F'), $D_{min}$ and N, i.e. S≤F (or F' if exponent compaction is applied) where N=E (or E')+F (or F')+$D_{min}$.

In step S706, the bit-width calculation logic 614 also determines the number of sum bits, D, in the set of sum bits 508 using: (i) one or more of the (configurable and/or dependent) system parameters, and (ii) the determined number of sign bits, S, in the set of sign bits 506. The decoding unit 602 may determine the number of sum bits, D, in the same way that the encoding unit 202 determines the number of sum bits as described above. In particular, this determination may involve assigning to $D_2$ as many of the free bits (F or F') that are left after the number of sign bits has been determined, without the number of sum bits, D, exceeding the system parameter $D_{max}$ that indicates the maximum number of sum bits to be included in the compressed data structure. As mentioned above and shown in FIG. 5, $D=D_{min}+D_2$, where $D_{min}$ is one of the (configurable) system parameters, so step S706 may involve determining $D_2$. If S>0, then if exponent compaction is not applied $D_2=\min(F-S, D_{max}-D_{min})$, and if exponent compaction is applied $D_2=\min(F'-S, D_{max}-D_{min})$. If S=0, which happens for a constant quad, then all three of the differential coefficients ($\delta_x$, $\delta_y$ and $\delta_{xy}$) are zero, and as such there is no need to assign any bits as mantissa bits for the differential coefficients, i.e., M=0. Therefore, any remaining bits of the free bits (F or F') can be allocated to the sum bits, even if this exceeds the maximum parameter, $D_{max}$ (otherwise the bits would simply go to waste). The maximal number of bits the sum value can have is n+2, which can therefore replace $D_{max}$ in the expression for $D_2$. That is, if S=0, then if exponent compaction is not applied $D_2=\min(F, n+2-D_{min})$, and if exponent compaction is applied $D_2=\min(F', n+2-D_{min})$. When $D_2$ has been determined then the number of sum bits, D, in the set of sum bits may be determined as $D=D_{min}+D_2$.

Furthermore, the bit-width calculation logic 614 may determine the number of mantissa bits, M, in the set of mantissa bits 510 using: (i) one or more of the (configurable and/or dependent) system parameters, (ii) the determined number of sign bits in the set of sign bits, and (iii) the determined number of sum bits in the set of sum bits. In particular, any remaining free bits (F or F') that are left after the number of sign bits and the number of sum bits have been determined are used to represent mantissa bits of the three differential coefficients $\delta_x$, $\delta_y$ and $\delta_{xy}$. If exponent compaction is not applied, the number of mantissa bits, M, is given by $M=F-S-D_2$, and if exponent compaction is applied, the number of mantissa bits, M, is given by $M=F'-S-D_2$.

When step S706 has been completed, all of the bit widths have been determined, i.e., the values of E (or E'), S, M and D have been determined in a manner that is in accordance with the (configurable and dependent) system parameters. In step S708, the signs, sums and mantissas unpacking logic 616 finishes unpacking the compressed data structure to identify the set of sign bits 506, the set of sum bits 508 and the set of mantissa bits 510. In particular, using the values of E (or E'), S, M and D, the unpacking unit 606 (in particular the signs, sums and mantissas unpacking logic 616) can read out the appropriate sets of bits from the compressed data structure 502, and passes: (i) the set of sign bits 506 to the sign decoding logic 618, (ii) the set of sum bits 508 to the sum decoding logic 620, and (iii) the set of mantissa bits 510 to the mantissa decoding logic 622. Then the four branches of the pipeline of the coefficient decoding module 608 shown in FIG. 6 can determine (in steps S710 to S716) the signs, exponents and mantissas of the differential coefficients ($\delta_x$, $\delta_y$ and $\delta_{xy}$) and the sum coefficient (¿).

In step S710 the exponent decoding logic 624 of the coefficient decoding module 608 uses the identified set of exponent bits 504 to determine exponents for the differential coefficients. For example, the exponent decoding logic 624 may use an encoded representation of an exponent value, $Exp_i$, for each of the differential coefficients, $\delta_i$, as received from the exponents unpacking logic 612, and may set the exponent value, $e_i$, for each of the differential coefficients to be equal to $Exp_i-1+e_{i,min}$. As described above, each $e_{i,min}$ is one of the system parameters and indicates a minimum exponent value for the differential coefficient $\delta_i$. Therefore, in this example, the exponents ($e_x$, $e_y$ and $e_{xy}$) for the differential coefficients ($\delta_x$, $\delta_y$ and $\delta_{xy}$) are determined according to:

$$e_x = \mathrm{Exp}_x - 1 + e_{x,min} \in [e_{x,min} - 1,\ e_{x,max}]$$

$$e_y = \mathrm{Exp}_y - 1 + e_{y,min} \in [e_{y,min} - 1,\ e_{y,max}]$$

$$e_{xy} = \mathrm{Exp}_{xy} - 1 + e_{xy,min} \in [e_{xy,min} - 1,\ e_{xy,max}]$$

In step S712 the sign decoding logic 618 of the coefficient decoding module 608 uses the identified set of sign bits 506 to determine signs for one or more of the differential coefficients. As described above, the number of sign bits in the set of sign bits 506 is equal to the number of the differential coefficients which are non-zero. Step S712 comprises, for each of the differential coefficients which is non-zero, determining that the sign of the differential coefficient is positive if a respective sign bit is set to a first value (e.g., a '0') and determining that the sign of the differential coefficient is negative if a respective sign bit is set to a second value (e.g., a '1'). Step S712 may be skipped if S=0 (i.e., a constant pixel quad).

In step S714 the mantissa decoding logic 622 of the coefficient decoding module 608 uses the identified set of mantissa bits to determine mantissas for one or more of the differential coefficients. Step S714 may be skipped if S=0 (i.e., a constant pixel quad) or M=0.

As described above, normally M will not be large enough to store enough mantissa bits for the differential coefficients to be encoded at full precision, and the most important (e.g., most significant) of the mantissa bits are kept. The same rules for determining which mantissa bits are kept are used in the encoding process (described above) and in the decoding process. For example, the M mantissa bits that are kept are selected from the MSBs (excluding the initial 1) of the magnitudes of the differential coefficients ($|\delta_x|$, $|\delta_y|$ and $|\delta_{xy}|$), e.g., in accordance with the following rules.

1. Select the MSB of the differential coefficients in the more significant place.
2. If bits are equal by rule (1) then select the MSB of the differential coefficient with a smaller exponent.
3. If bits are equal by rules (1) and (2) then use a tie-break condition, e.g., to select the MSB of the differential coefficient given by a predetermined order of precedence, e.g., $\delta_x$ then $\delta_y$ then $\delta_{xy}$.

In the example encoding process described above, five mantissa bits ($m_4$, $m_3$, $m_2$, $m_1$ and $m_0$) were stored. In this example, an example assignment of the limited number of M mantissa bits, to the magnitudes of three differential coefficients ($|\delta_x|$, $|\delta_y|$ and $|\delta_{xy}|$) is shown below with M=5 resulting in $M_x$=2, $M_y$=2, and $M_{xy}$=1 given their respective exponent values:

| $\lvert\delta_x\rvert$: | | | |
|---|---|---|---|
| 1 | $m_4$ | $m_3$ | 0 |

| $\lvert\delta_y\rvert$: | | | | |
|---|---|---|---|---|
| 1 | $m_2$ | $m_1$ | 0 | 0 |

| $\lvert\delta_{xy}\rvert$: | | | |
|---|---|---|---|
| 1 | $m_0$ | 0 | 0 |

It is noted that in the example shown above, the bits that are appended to the mantissa bit(s) for each of the differential coefficients are all zeros (0000 . . . ), but in other examples they might not be all zeros, e.g. they may be all ones (1111 . . . ) or a mixture of ones and zeros, such as a value close to a half, e.g. a one followed by all zeros (1000 . . . ) or a zero followed by all ones (0111 . . . ).

In step S716 the sum decoding logic 620 of the coefficient decoding module 608 uses the identified set of sum bits 508 to determine the sum coefficient. As described above the sum bits may be encoded in an odd mode in which there is an odd number of steps between consecutive representable sum values from the smallest representable sum value to the largest representable sum value in the sequence (and therefore an even number of encodings in total), or the sum bits may be encoded in an even mode in which there is an even number of steps between consecutive representable sum values from the smallest representable sum value to the largest representable sum value in the sequence (and therefore an odd number of encodings in total). As mentioned above, the odd mode may be more suitable than the even mode when the pixel values of the pixels of the block are in an unsigned format, whereas the even mode may be more suitable than the odd mode when the pixel values of the pixels of the block are in a signed format. When the sum decoding logic 620 operates in the odd mode the decoded sum coefficient Σ' may be determined, from the value represented by the set of sum bits (Σ) such that $$\sum' = \left\lfloor \frac{2^{n+2}-4}{2^D-1}\sum + \frac{1}{2} \right\rfloor = \left\lfloor \frac{(2^{n+3}-8)\sum + 2^D - 1}{2^{D+1}-2} \right\rfloor,$$

where the brackets ⌊ ⌋ represent the (integer) floor function, and where it is noted that $$\frac{2^{n+2}-4}{2^D-1}$$

is the reciprocal of the traction given in the example above for encoding the sum coefficient in the odd mode. This expression is given for exposition only, and it is noted that the numerator of the second expression ($(2^{n+3}-8)\Sigma+2^D-1$) can be calculated by simple fixed-point arithmetic, e.g., a combination of shift, add and multiply operations. The division of the numerator by the denominator ($2^{D+1}-2$) could be implemented using a look up table (e.g., when static configurable system parameters are implemented) or by performing a full division operation (e.g., when dynamic configurable system parameters are implemented). When the sum decoding logic 620 operates in the even mode the decoded sum coefficient Σ' may be determined, from the value represented by the set of sum bits (Σ) such that $$\sum' = \left\lfloor \frac{2^{n+2}}{2^D-2}\sum + \frac{1}{2} \right\rfloor = \left\lfloor \frac{(2^{n+2})\sum + 2^{D-1} - 1}{2^D-2} \right\rfloor,$$

where it is noted that $$\frac{2^{n+2}}{2^D-2}$$

is the reciprocal of the fraction given in the example above for encoding the sum coefficient in the even mode. Again, this expression is given for exposition only, and it is noted that the numerator of the second expression ($(2^n 2)\Sigma+2^{D-1}-1$) can be calculated by simple fixed-point arithmetic, e.g., a combination of shift, add and multiply operations. The division of the numerator by the denominator ($2^D-2$) could be implemented using a look up table (e.g., when static configurable system parameters are implemented) or by performing a full division operation (e.g., when dynamic configurable system parameters are implemented).

It is noted that steps S710 to S716 are independent of each other and could be performed in any order or (at least partially) in parallel/concurrently. The decoded exponents, signs and mantissas of the differential coefficients and the decoded sum coefficient are passed to the decoded value determination module 610.

In step S718 the decoded value determination module 610 determines a decoded value by determining the result of a weighted sum of the differential coefficients and the sum coefficient for the block of pixels using: (i) the determined exponents for the differential coefficients, (ii) the determined signs for said one or more of the differential coefficients, (iii) the determined mantissas for said one or more of the differential coefficients, (iv) the determined sum coefficient, and (v) respective weights for the differential coefficients and the sum coefficient. As mentioned above, in some cases there might not be any mantissa bits (i.e., M may equal zero), but in the main examples described herein there are some mantissa bits (i.e., M>0). The differential coefficients are determined using the determined exponents, signs and mantissas for the differential coefficients. In some examples, the coefficient assembly logic 626 could be configured to generate only differential coefficients having non-zero weights, thereby reducing power consumption (by avoiding generating and using differential coefficients which will not contribute to the result of the weighted sum because their weights are zero).

In particular, in step S718, the coefficient assembly logic 626 assembles the exponents, signs and mantissas to determine the decoded differential coefficients ($\delta'_x$, $\delta'_y$ and $\delta'_{xy}$). If an encoded representation of an exponent value, $Exp_i$, for a differential coefficient, $\delta_i$ (for $i \in x, y, xy$), is zero, then that differential coefficient is determined to be zero. Whereas, if an encoded representation of an exponent value, $Exp_i$, for a differential coefficient, $\delta_i$ (for $i \in x, y, xy$), is not zero, then that differential coefficient is determined by assembling the exponent value ($e_i$), the sign ($Sgn_i$) and the mantissa ($Mnt_i$) as if the value was in a floating point format. However, the differential coefficients were originally in a signed integer format, so the coefficient assembly logic 626 may be considered to convert floating point representations of the differential coefficients into a signed integer format. For example, the decoded differential coefficients ($\delta'_x$, $\delta'_y$ and $\delta'_{xy}$) may be determined according to the following equations:

$$\delta'_x = \begin{cases} 0 \text{ if } \mathrm{Exp}_x = 0 \\ \mathrm{Sgn}_x 2^{e_x}\left(1 + 2^{-M_x} Mnt_x\right) \text{ if } \mathrm{Exp}_x > 0 \end{cases}$$

$$\delta'_y = \begin{cases} 0 \text{ if } \mathrm{Exp}_y = 0 \\ \mathrm{Sgn}_y 2^{e_y}\left(1 + 2^{-M_y} Mnt_y\right) \text{ if } \mathrm{Exp}_y > 0 \end{cases}$$

$$\delta'_{xy} = \begin{cases} 0 \text{ if } \mathrm{Exp}_{xy} = 0 \\ \mathrm{Sgn}_{xy} 2^{e_{xy}}\left(1 + 2^{-M_{xy}} Mnt_{xy}\right) \text{ if } \mathrm{Exp}_{xy} > 0 \end{cases}$$

where $M_i$ is the number of mantissa bits included in the compressed data structure for the differential coefficient, $\delta_i$ (for $i \in x, y, xy$).

The output of the coefficient assembly logic 626 is a set of Haar coefficients for the block of pixels. As described above, the block of pixels may be a contiguous block of pixels and may comprise four pixels. In the main examples described herein the block of pixels is a 2×2 quad of pixels (e.g., the 2×2 quad of pixels 402 shown in FIG. 4). In these examples, as described above, the set of Haar coefficients comprises a sum coefficient ($\Sigma'$) and three directional differential coefficients, respectively indicating a horizontal differential ($\delta'_x$), a vertical differential ($\delta'_y$) and a diagonal differential ($\delta'_{xy}$) in the 2×2 quad 402.

The Haar inverse transform logic 628 uses the set of Haar coefficients to determine the decoded value. In particular, the Haar inverse transform logic 628 determines the decoded value by determining the result of a weighted sum of the differential coefficients and the sum coefficient for the block of pixels.

In some examples, the decoding unit 602 may be operating as a decompression unit, such that it is aiming to recover a pixel value of one (or more) of the pixels of the block of pixels. In this case, the respective weights for the differential coefficients are predetermined, e.g., all of the weights for the differential coefficients may have a magnitude of 1 (but they might not all have the same sign) to determine a decoded value representing a pixel of the block of pixels 402.

For example, a decoded value (a') representing pixel a in the block of pixels 402 may be determined using a weight of +1 for the sum coefficient and the $\delta'_{xy}$ differential coefficient, and a weight of −1 for the $\delta'_x$ and $\delta'_y$ differential coefficients, such that a' is determined in accordance with $$a' = \mathrm{clamp}\left(\left\lfloor \frac{1}{4}\left(\sum{}' - \delta'_x - \delta'_y + \delta'_{xy} + 2\right)\right\rfloor, 0, 2^n - 1\right) \in [0, 2^n - 1].$$

The clamping limits the decoded pixel value to the allowed range for an n-bit value: $[0, 2^n-1]$. The "+2" is in the sum to effect a round to nearest mode (i.e., round half away from zero), but it is noted that in other examples different rounding modes may be used (e.g., round away from zero or round towards zero).

Similarly, a decoded value (b') representing pixel b in the block of pixels 402 may be determined using a weight of +1 for the sum coefficient and the $\delta'_x$ differential coefficient, and a weight of −1 for the $\delta'_x$ and $\delta'_{xy}$ differential coefficients, such that b' is determined in accordance with $$b' = \mathrm{clamp}\left(\left\lfloor \frac{1}{4}\left(\sum{}' + \delta'_x - \delta'_y - \delta'_{xy} + 2\right)\right\rfloor, 0, 2^n - 1\right) \in [0, 2^n - 1].$$

Similarly, a decoded value (c') representing pixel c in the block of pixels 402 may be determined using a weight of +1 for the sum coefficient and the $\delta'_y$ differential coefficient, and a weight of −1 for the $\delta'_x$ and $\delta'_{xy}$ differential coefficients, such that c' is determined in accordance with $$c' = \mathrm{clamp}\left(\left\lfloor \frac{1}{4}\left(\sum{}' - \delta'_x + \delta'_y - \delta'_{xy} + 2\right)\right\rfloor, 0, 2^n - 1\right) \in [0, 2^n - 1].$$

Similarly, a decoded value (d') representing pixel d in the block of pixels 402 may be determined using a weight of +1 for the sum coefficient and the three differential coefficients $\delta'_x$, $\delta'_y$ and $\delta'_{xy}$, such that d' is determined in accordance with $$d' = \mathrm{clamp}\left(\left\lfloor \frac{1}{4}\left(\sum{}' + \delta'_x + \delta'_y + \delta'_{xy} + 2\right)\right\rfloor, 0, 2^n - 1\right) \in [0, 2^n - 1].$$

The divide by 4 operation can be implemented by the Haar inverse transform logic 628 by performing a binary right shift on the result of the weighted sum by 2 binary places.

In step S720 the determined decoded value is output. In particular, the decoded value determination module 610 outputs the decoded value, which can be used in any suitable manner, e.g., processed by a processing unit, transmitted to another device or stored in a memory (e.g., in the memory 604) to give just a few examples of how the decoded value may be used.

In some examples, where the block of pixels is a 2×2 quad of pixels (e.g., pixel quad 402), four decoded values may be determined for the respective four pixels of the 2×2 quad of pixels by determining the results of four weighted sums of the differential coefficients and the sum coefficient for the block of pixels. Each of the four weighted sums uses a respective set of weights for the differential coefficients, where the sets of weights are set such that the four decoded values represent values at the four pixel positions of the 2×2 quad of pixels (e.g., as shown in the four equations above).

In some examples, the compressed data structure 502 may be decoded to determine four decoded values in parallel. For example, there may be four instances of the Haar inverse transform logic 628 which operate in parallel to determine respective decoded values (a, b, c and d respectively) as described above. Each of the instances may operate in the same way as the Haar inverse transform logic 628 described above, but producing a single value only (rather than four). Each of the Haar inverse transform logic instances may use a different set of weights in the weighted sum in step S718 so that the different pixel values can be determined. In this example, the weights do not need to be changed during runtime, so the weights are predetermined for use by the different instances of the Haar inverse transform logic 628. For example, the weights may be pre-stored in the instances of the Haar inverse transform logic 628 and/or configured into the hardware (e.g., fixed function circuitry) of the instances of the Haar inverse transform logic 628. In particular, a first Haar inverse transform logic instance may determine a decoded value (a') representing pixel a in the block of pixels 402 using a weight of +1 for the sum coefficient and the $\delta'_{xy}$ differential coefficient, and a weight of −1 for the $\delta'_x$ and $\delta'_y$ differential coefficients. A second Haar inverse transform logic instance may determine a decoded value (b') representing pixel b in the block of pixels 402 using a weight of +1 for the sum coefficient and the $\delta'_x$ differential coefficient, and a weight of −1 for the $\delta_y'$ and $\delta_{xy}$ differential coefficients. A third Haar inverse transform logic instance may determine a decoded value (c') representing pixel c in the block of pixels 402 using a weight of +1 for the sum coefficient and the $\delta'_y$ differential coefficient, and a weight of −1 for the $\delta'_x$ and $\delta'_{xy}$ differential coefficients. A fourth Haar inverse transform logic instance may determine a decoded value (d') representing pixel d in the block of pixels 402 using a weight of +1 for the sum coefficient and the three differential coefficients $\delta_x'$, $\delta_y'$ and $\delta_{xy}'$.

The decoding unit might not be intended to apply filtering to the values, and may instead be intended to provide representations of the original pixel values. These representations may be exactly the same as the original pixel values (for pixel quads that are compressed in a lossless manner) or they may be approximations of the original pixel values (for pixel quads that are compressed in a lossy manner). This approach is useful for a frame buffer decompression process.

In the decoding examples described above the pixel values relate to a single channel of data, and if the pixel values have channel values in multiple channels then the different channels may be encoded separately, i.e. independently. However, in some other examples, each pixel in the block of pixels may have a channel value in a plurality of channels (e.g., a Red channel, a Green channel, a Blue channel, and sometimes an Alpha channel too), where channel recorrelation may be performed on the decoded value before it is output (between steps S718 and S720). For example, as described above in relation to channel decorrelation in the encoding process, a Green channel may be used as a reference channel. Colour recorrelation may be performed on the Red channel by replacing the decoded pixel values, R'(x), for pixel positions, x, in the Red channel with recorrelated values, R(x), where R(x)=R'(x)+G(x). Furthermore, colour recorrelation may be performed on the Blue channel by replacing the decoded pixel values, B'(x), for pixel positions, x, in the Blue channel with recorrelated values, B(x), where B(x)=B'(x)+G(x). The recorrelated values (R(x) and B(x)) may be clamped to the original pixel value range, in order to avoid wrap-around overflow or underflow when reducing down to the original number of pixel value bits.

As described above, the colour decorrelation and recorrelation can improve the quality of the encoding and decoding (i.e., reduce the amount of information that is lost in the encoding and decoding process) particularly if the different channels are highly correlated, e.g., for (near) greyscale images.

In the examples described above the decoding unit 602 is operating as a decompression unit, such that it is aiming to recover a pixel value of one (or more) of the pixels of the block of pixels. In other examples, the decoding unit 602 may be used for texture filtering. In this example, the weights are not predetermined. This allows the weights to be altered in runtime to provide different types of filtering, e.g., isotropic filtering or anisotropic filtering with different levels of detail, different anisotropic ratios and different anisotropic directions. The weights can be determined based on one or more of: (i) a position, relative to the 2×2 quad of pixels, that the decoded value is to be determined for (e.g., as indicated by u and v coordinates); (ii) an indication of a level of detail to be provided by the decoded value; and (iii) an indication of an amount and/or direction of anisotropy to be provided by the decoded value. The indications (i), (ii) and (iii) may together determine a respective weight ($w_x$, $w_y$ and $w_{xy}$) for each of the differential coefficients ($\delta_x$, $\delta_y$ and $\delta_{xy}$). In particular, the weighted sum is given by:

$$\text{decoded value} = \left\lfloor \frac{1}{4}\left(\sum{}' + w_x\delta'_x + w_y\delta'_y + w_{xy}\delta'_{xy} + 2\right)\right\rfloor$$

where some scaling, rounding and/or clamping may be included in determining the result of the weighted sum. In these examples, if there are no mantissa bits then the result of the weighted sum of the differential coefficients for the block of pixels may be determined in step S718 by performing a binary shift of the weights ($w_x$, $w_y$ and $w_{xy}$) in accordance with the determined exponents for a respective one or more of the differential coefficients which are non-zero, and summing the determined sum coefficient and the shifted weights in accordance with the determined signs for the respective one or more of the differential coefficients which are non-zero. If there are mantissa bits then each mantissa bit may be represented by a new term in the weighted sum which is determined by performing a binary shift of the appropriate weight ($w_x$, $w_y$ or $w_{xy}$) by an appropriate number of binary places in accordance with the significance of the mantissa bit. Performing the weighted sum as a sum of shifted versions of the weights and the sum coefficient is efficient (in terms of latency, power consumption and/or silicon area) to implement in hardware, e.g., fixed function circuitry compared to performing multiplication and division operations.

Figure 8:
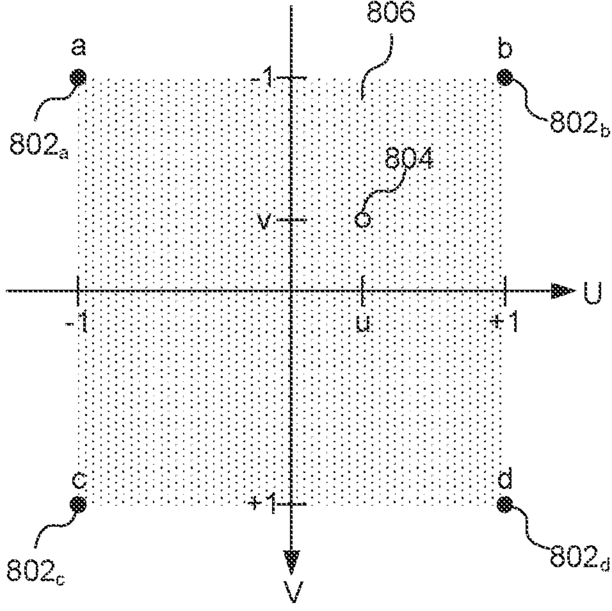
FIG. 8 illustrates a pixel quad with a sampling position within the area defined by the pixel quad.

The precise details of how the weights may be determined during runtime may be different in different examples. FIG. 8 shows how the u and v coordinates can define a position somewhere within the 2×2 pixel quad made up of pixels a, b, c and d (denoted $\mathbf{802}_a$, $\mathbf{802}_b$, $\mathbf{802}_c$, and $\mathbf{802}_d$ in FIG. 8). As shown in FIG. 8, the coordinates of pixel a are (−1,−1), the coordinates of pixel b are (+1,−1), the coordinates of pixel c are (−1,+1), and the coordinates of pixel d are (+1,+1). FIG. 8 shows a sample position 804 at coordinates (u,v) within the area of the pixel quad. The area of the pixel quad is shown in FIG. 8 as the dotted square region 806 having corners defined by the positions of the pixels a, b, c and d.

As described above, a decoded value (or "sample value") may be determined to be $$\left\lfloor \frac{1}{4}\left(\sum' + w_x\delta'_x + w_y\delta'_y + w_{xy}\delta'_{xy} + 2\right)\right\rfloor.$$

The $w_x$ weight may be determined as a first function ($f_1$) of u and one or more of: an LOD parameter ($p_\lambda$) indicating a level of detail to be provided by the decoded value, an anisotropic ratio ($p_\alpha$), and a direction of anisotropy ($\varphi$), i.e., $w_x=f_1(u,p_\lambda,p_\alpha,\varphi)$. The $w_y$ weight may be determined as a second function ($f_2$) of v and one or more of: an LOD parameter ($p_\lambda$) indicating a level of detail to be provided by the decoded value, an anisotropic ratio ($p_\alpha$), and a direction of anisotropy ($\varphi$), i.e., $w_y=f_2(v,p_\lambda,p_\alpha,\varphi)$. The $w_{xy}$ weight may be determined as a third function ($f_3$) of u and v and one or more of: an LOD parameter ($p_\lambda$) indicating a level of detail to be provided by the decoded value, an anisotropic ratio ($p_\alpha$), and a direction of anisotropy ($\varphi$), i.e., $w_{xy}=f_3(u,v,p_\lambda,p_\alpha,\varphi)$. A person skilled in the art would know how to implement the functions $f_1$, $f_2$ and $f_3$ in order to obtain a desired behaviour of the filtering process.

For example, in order to implement LOD0 filtering (which applies no blurring to the pixel quad), with no anisotropy (i.e., with isotropic filtering) then the weights can be determined as $w_x=u$, $w_y=v$ and $w_{xy}=uv$. In this way, as described above: at pixel a, $w_x=-1$, $w_y=-1$ and $w_{xy}=+1$, and the decoded value is given by $$\left\lfloor \frac{1}{4}\left(\sum' - \delta'_x - \delta'_y + \delta'_{xy} + 2\right)\right\rfloor;$$

at pixel b, $w_x=+1$, $w_y=-1$ and $w_{xy}=-1$, and the decoded value is given by $$\left\lfloor \frac{1}{4}\left(\sum' - \delta'_x - \delta'_y + \delta'_{xy} + 2\right)\right\rfloor;$$

at pixel c, $w_x=-1$, $w_y=+1$ and $w_{xy}=-1$, and the decoded value is given by $$\left\lfloor \frac{1}{4}\left(\sum' - \delta'_x - \delta'_y + \delta'_{xy} + 2\right)\right\rfloor;$$

and at pixel d, $w_x=+1$, $w_y=+1$ and $w_{xy}=+1$, and the decoded value is given by $$\left\lfloor \frac{1}{4}\left(\sum' - \delta'_x - \delta'_y + \delta'_{xy} + 2\right)\right\rfloor.$$

Furthermore, at the centre of the pixel quad, $w_x=w_y=w_{xy}=0$, and the decoded value is given by $$\left\lfloor \frac{1}{4}\left(\sum' + 2\right)\right\rfloor.$$

At a general sample position 804 with coordinate uv, $w_x=u$, $w_y=v$ and $w_{xy}=uv$, and the decoded value is given by $$\left\lfloor \frac{1}{4}\left(\sum' + u\delta'_x + v\delta'_y + uv\delta'_{xy} + 2\right)\right\rfloor.$$

If the LOD parameter indicates that LOD1 filtering is to be applied (i.e., the pixel quad is to be blurred by halving the resolution) then $w_x=w_y=w_{xy}=0$ for any value of u and v, i.e., given by $$\left\lfloor \frac{1}{4}\left(\sum' + 2\right)\right\rfloor,$$

and to avoid discontinuous sampling, the result may be further interpolated (e.g., according to bilinear interpolation) with sample values from 3 neighbouring pixel quads (one horizontally neighbouring pixel quad, one vertically neighbouring pixel quad and one diagonally neighbouring pixel quad). The neighbouring pixel quads to use for the further interpolation may be selected based on which quadrant of the area within the pixel quad the sampling position is in (based on the u and v coordinates). For example, with reference to FIG. 8, if u is positive then a horizontally neighbouring pixel quad to the right may be selected for the further interpolation, whereas if u is negative then a horizontally neighbouring pixel quad to the left may be selected for the further interpolation. Similarly, if v is positive then a vertically neighbouring pixel quad below may be selected for the further interpolation, whereas if v is negative then a vertically neighbouring pixel quad above may be selected for the further interpolation. Similarly, if u and v are both positive then a diagonally neighbouring pixel downwards and to the right may be selected for the further interpolation, if u is positive and v is negative then a diagonally neighbouring pixel upwards and to the right may be selected for the further interpolation, if u is negative and v is positive then a diagonally neighbouring pixel downwards and to the left may be selected for the further interpolation, and if u and v are both negative then a diagonally neighbouring pixel upwards and to the left may be selected for the further interpolation. For a zero coordinate (i.e. u=0 or v=0) the choice of the neighbouring quad for that dimension is arbitrary as it should not matter which neighbouring pixel quad is chosen, the result should still be the same. The contributions of the sample values from the pixel quad in question and the 3 neighbouring pixel quads (i.e., according to some interpolation), may depend on the indications (i), (ii) and (iii) (resulting in weights $w_x$, $w_y$ and $w_{xy}$) at this incremented level of detail, in an analogous way to LOD0 (as would be apparent to someone skilled in the art).

As another example, if anisotropic filtering in the form of horizontal blur is to be applied then $w_x=0$, $w_y=v$ and $w_{xy}=0$, and the decoded value is given by $$\left\lfloor \frac{1}{4}\left(\sum' + v\delta'_y + 2\right)\right\rfloor.$$

To avoid discontinuous sampling, the result can be further interpolated (e.g., according to bilinear interpolation) with a sample value from one horizontally neighbouring pixel quad. The horizontally neighbouring pixel quad to use for the further interpolation may be selected based on which half (left or right) of the area within the pixel quad the sampling position is in (based on the u coordinate). For example, with reference to FIG. 8, if u is positive then a horizontally neighbouring pixel quad to the right may be selected for the further interpolation, whereas if u is negative then a horizontally neighbouring pixel quad to the left may be selected for the further interpolation. If u=0 the choice of the neighbouring quad to the left or right is arbitrary as it should not matter which neighbouring pixel quad is chosen, the result should still be the same. In this example, the contributions of the sample values from the pixel quad in question and the neighbouring pixel quad (i.e., according to some interpolation), depends on the indications (i), (ii) and (iii) (resulting in weight $w_y$) at this incremented level of detail, in an analogous way to LOD0 (as would be apparent to someone skilled in the art).

As another example, if anisotropic filtering in the form of vertical blur is to be applied then $w_x=u$, $w_y=0$ and $w_{xy}=0$, and the decoded value is given by $$\left\lfloor \frac{1}{4}\left(\sum' + u\delta'_x + 2\right)\right\rfloor.$$

To avoid discontinuous sampling, the result can be further interpolated (e.g., according to bilinear interpolation) with a sample value from one vertically neighbouring pixel quad. The vertically neighbouring pixel quad to use for the further interpolation may be selected based on which half (top or bottom) of the area within the pixel quad the sampling position is in (based on the v coordinate). For example, with reference to FIG. 8, if v is positive then a vertically neighbouring pixel quad below may be selected for the further interpolation, whereas if v is negative then a vertically neighbouring pixel quad above may be selected for the further interpolation. If v=0 the choice of the neighbouring quad above or below is arbitrary as it should not matter which neighbouring pixel quad is chosen, the result should still be the same. In this example, the contributions of the sample values from the pixel quad in question and the neighbouring pixel quad (i.e., according to some interpolation), depends on the indications (i), (ii) and (iii) (resulting in weight $w_y$) at this incremented level of detail, in an analogous way to LOD0 (as would be apparent to someone skilled in the art).

For the clarity of this description, the examples given above are simple examples of how the weights may be determined based on one or more of: (i) a position, relative to the 2×2 quad of pixels, that the decoded value is to be determined for (e.g., as indicated by u and v coordinates); (ii) an indication of a level of detail to be provided by the decoded value; and (iii) an indication of an amount and/or direction of anisotropy to be provided by the decoded value. A person skilled in the art would be aware of how to adjust the weights so that different types of filtering (e.g., applying different LODs, different anisotropic ratios and/or different angles of anisotropy) could be applied.

Figure 9:
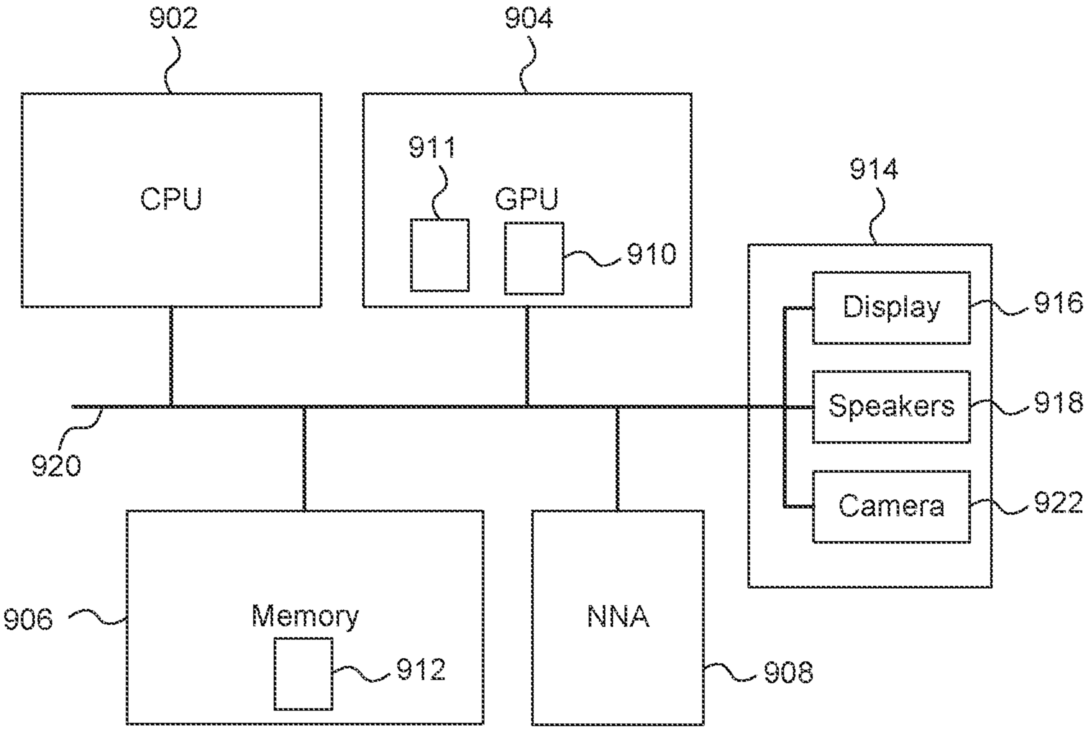
FIG. 9 shows a computer system in which an encoding and/or decoding unit is implemented.

FIG. 9 shows a computer system in which the graphics processing systems described herein may be implemented. The computer system comprises a CPU 902, a GPU 904, a memory 906, a neural network accelerator (NNA) 908 and other devices 914, such as a display 916, speakers 918 and a camera 922. A processing block 910 (corresponding to encoding unit 202 and/or decoding unit 602 or 802) is implemented on the GPU 904. In other examples, one or more of the depicted components may be omitted from the system, and/or the processing block 910 may be implemented on the CPU 902 or within the NNA 908. The components of the computer system can communicate with each other via a communications bus 920. A store 912 (corresponding to memory 204, 604 or 804) is implemented as part of the memory 906.

The encoding and/or decoding units (202, 602, 802) of FIGS. 2, 6 and 8 are shown as comprising a number of functional blocks. This is schematic only and is not intended to define a strict division between different logic elements of such entities. Each functional block may be provided in any suitable manner. It is to be understood that intermediate values described herein as being formed by an encoding unit or a decoding unit need not be physically generated by the encoding and/or decoding unit at any point and may merely represent logical values which conveniently describe the processing performed by the encoding and/or decoding unit between its input and output.

The encoding and/or decoding units described herein may be embodied in hardware on an integrated circuit. The encoding and/or decoding units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an encoding and/or decoding unit configured to perform any of the methods described herein, or to manufacture an encoding and/or decoding unit comprising any apparatus described herein. An integrated circuit definition dataset may be, for example, an integrated circuit description.

Therefore, there may be provided a method of manufacturing, at an integrated circuit manufacturing system, an encoding and/or decoding unit as described herein. Furthermore, there may be provided an integrated circuit definition dataset that, when processed in an integrated circuit manufacturing system, causes the method of manufacturing an encoding and/or decoding unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an encoding and/or decoding unit will now be described with respect to FIG. 10.

Figure 10:
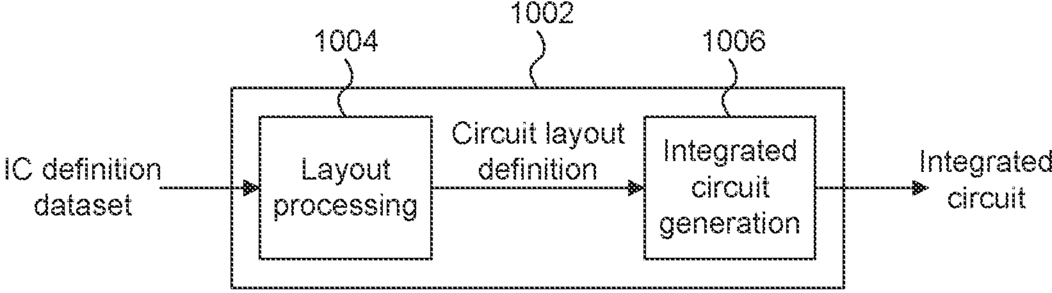
FIG. 10 shows an integrated circuit manufacturing system for generating an integrated circuit embodying an encoding and/or decoding unit.

FIG. 10 shows an example of an integrated circuit (IC) manufacturing system 1002 which is configured to manufacture an encoding and/or decoding unit as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining an encoding and/or decoding unit as described in any of the examples herein), process the IC definition dataset, and generate an IC according to the IC definition dataset (e.g. which embodies an encoding and/or decoding unit as described in any of the examples herein). The processing of the IC definition dataset configures the IC manufacturing system 1002 to manufacture an integrated circuit embodying an encoding and/or decoding unit as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an encoding and/or decoding unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of decoding a compressed data structure to determine a decoded value in accordance with system parameters in a computer system, wherein the compressed data structure encodes a set of Haar coefficients for a block of pixels, wherein the set of Haar coefficients comprises a plurality of differential coefficients and a sum coefficient, wherein a first portion of the compressed data structure comprises a set of exponent bits representing exponents for the differential coefficients, a second portion of the compressed data structure comprises a set of sign bits representing signs for the differential coefficients, and a third portion of the compressed data structure comprises a set of sum bits representing the sum coefficient, wherein the first, second and third portions of the compressed data structure are distinct from each other and wherein the numbers of bits in the first, second and third portions of the compressed data structure are defined based on the system parameters;

wherein the system parameters comprise a plurality of configurable system parameters and a plurality of dependent system parameters which are determined based on one or more of the configurable system parameters; and wherein the method comprises:

unpacking the compressed data structure to identify the set of exponent bits, the set of sign bits and the set of sum bits;

using the identified set of exponent bits to determine exponents for the differential coefficients;

using the identified set of sign bits to determine signs for one or more of the differential coefficients;

using the identified set of sum bits to determine the sum coefficient;

determining the decoded value by determining the result of a weighted sum of the differential coefficients and the sum coefficient for the block of pixels using: (i) the determined exponents for the differential coefficients, (ii) the determined signs for said one or more of the differential coefficients, (iii) the determined sum coefficient, and (iv) respective weights for the differential coefficients and the sum coefficient; and outputting the determined decoded value.

2. The method of claim 1, wherein one or more of the system parameters define the number of exponent bits in the set of exponent bits.

3. The method of claim 1, wherein said unpacking the compressed data structure comprises:

reading the first portion of the compressed data structure and determining how many of the differential coefficients are non-zero based on the set of exponent bits; and determining the number of sign bits in the set of sign bits to be equal to the number of the differential coefficients that are non-zero.

4. The method of claim 3, wherein said unpacking the compressed data structure further comprises determining the number of sum bits in the set of sum bits using: (i) one or more of the system parameters, and (ii) the determined number of sign bits in the set of sign bits.

5. The method of claim 1, wherein a fourth portion of the compressed data structure comprises a set of mantissa bits representing mantissas for the differential coefficients, wherein the number of bits in the fourth portion of the compressed data structure is in accordance with the system parameters, and wherein said unpacking the compressed data structure identifies the set of mantissa bits, wherein the method further comprises using the identified set of mantissa bits to determine mantissas for one or more of the differential coefficients, and wherein said determining the decoded value by determining the result of a weighted sum of the differential coefficients and the sum coefficient for the block of pixels further uses the determined mantissas for said one or more of the differential coefficients.

6. The method of claim 5, wherein said unpacking the compressed data structure further comprises determining the number of sum bits in the set of sum bits using: (i) one or more of the system parameters, and (ii) the determined number of sign bits in the set of sign bits, and wherein said unpacking the compressed data structure further comprises determining the number of mantissa bits in the set of mantissa bits using: (i) one or more of the system parameters, (ii) the determined number of sign bits in the set of sign bits, and (iii) the determined number of sum bits in the set of sum bits.

7. The method of claim 5 wherein, for encoding the block of pixels, the compressed data structure includes only the set of exponent bits in the first portion, the set of sign bits in the second portion, the set of sum bits in the third portion and the set of mantissa bits in the fourth portion, such that the number of bits in the compressed data structure, N, equals a sum of the number of exponent bits in the set of exponent bits, the number of sign bits in the set of sign bits, the number of sum bits in the set of sum bits, and the number of mantissa bits in the set of mantissa bits.

8. The method of claim 1, wherein said determining the decoded value by determining the result of a weighted sum of the differential coefficients and the sum coefficient for the block of pixels comprises determining the differential coefficients using the determined exponents and signs for the differential coefficients.

9. The method of claim 5, wherein said determining the decoded value by determining the result of a weighted sum of the differential coefficients and the sum coefficient for the block of pixels comprises determining the differential coefficients using the determined exponents and signs for the differential coefficients, and wherein said determining the differential coefficients further uses the determined mantissas for the differential coefficients.

10. The method of claim 1, wherein said determining the decoded value comprises performing a binary right shift on the result of the weighted sum by 2 binary places to thereby divide the result of the weighted sum by 4, and wherein rounding is applied to determine the decoded value.

11. The method of claim 1, wherein said determining the result of a weighted sum of the differential coefficients and the sum coefficient for the block of pixels comprises:

performing a binary shift of the weights in accordance with the determined exponents for a respective one or more of the differential coefficients which are non-zero; and summing the determined sum coefficient and the shifted weights in accordance with the determined signs for the respective one or more of the differential coefficients which are non-zero.

12. The method of claim 1, wherein the respective weights for the differential coefficients are predetermined, and wherein the decoded value represents a value at a pixel position of one of the pixels of the block of pixels.

13. The method of claim 1, further comprising determining the respective weights for the differential coefficients, wherein the weights are determined based on one or more of:

a position, relative to the block of pixels, for which the decoded value is to be determined;

an indication of a level of detail to be provided by the decoded value; and an indication of an amount and/or direction of anisotropy to be provided by the decoded value.

14. The method of claim 1, wherein each pixel in the block of pixels is represented with an n-bit pixel value, wherein n is one of the configurable system parameters; and wherein the compressed data structure has N bits, wherein N is one of the configurable system parameters.

15. The method of claim 1, wherein the number of sign bits in the set of sign bits is equal to the number of the differential coefficients which are non-zero, and wherein said using the identified set of sign bits to determine signs for said one or more of the differential coefficients comprises, for each of the differential coefficients which is non-zero, determining that the sign of the differential coefficient is positive if a respective sign bit is set to a first value and determining that the sign of the differential coefficient is negative if a respective sign bit is set to a second value.

16. The method of claim 1, wherein the pixel values of the pixels of the block are in an unsigned format, and wherein said using the identified set of sum bits to determine the sum coefficient comprises mapping the sum bits to a sum value from a sequence of representable sum values whilst operating in an odd mode in which there is an odd number of steps between consecutive representable sum values from the smallest representable sum value to the largest representable sum value in the sequence.

17. The method of claim 1, wherein the pixel values of the pixels of the block are in a signed format, and wherein said using the identified set of sum bits to determine the sum coefficient comprises mapping the sum bits to a sum value from a sequence of representable sum values whilst operating in an even mode in which there is an even number of steps between consecutive representable sum values from the smallest representable sum value to the largest representable sum value in the sequence.

18. The method of claim 1, wherein said using the identified set of exponent bits to determine exponents for the differential coefficients comprises:

determining an encoded representation of an exponent value, $Exp_i$, for each of the differential coefficients, $\delta_i$; and setting the exponent value, $e_i$, for each of the differential coefficients to be equal to $Exp_i-1+e_{i,min}$, wherein $e_{i,min}$ is one of the configurable system parameters and indicates a minimum exponent value for the differential coefficient $\delta_i$.

19. A decoding unit configured to decode a compressed data structure to determine a decoded value in accordance with system parameters in a computer system, wherein the compressed data structure encodes a set of Haar coefficients for a block of pixels, wherein the set of Haar coefficients comprises a plurality of differential coefficients and a sum coefficient, wherein a first portion of the compressed data structure comprises a set of exponent bits representing exponents for the differential coefficients, a second portion of the compressed data structure comprises a set of sign bits representing signs for the differential coefficients, and a third portion of the compressed data structure comprises a set of sum bits representing the sum coefficient, wherein the first, second and third portions of the compressed data structure are distinct from each other and wherein the numbers of bits in the first, second and third portions of the compressed data structure are defined based on the system parameters;

wherein the system parameters comprise a plurality of configurable system parameters and a plurality of dependent system parameters which are determined based on one or more of the configurable system parameters; and wherein the decoding unit comprises:

an unpacking unit configured to unpack the compressed data structure to identify the set of exponent bits, the set of sign bits and the set of sum bits;

a coefficient decoding module configured to:

use the identified set of exponent bits to determine exponents for the differential coefficients, use the identified set of sign bits to determine signs for one or more of the differential coefficients, and use the identified set of sum bits to determine the sum coefficient; and a decoded value determination module configured to:

determine the decoded value by determining the result of a weighted sum of the differential coefficients and the sum coefficient for the block of pixels using: (i) the determined exponents for the differential coefficients, (ii) the determined signs for said one or more of the differential coefficients, (iii) the determined sum coefficient, and (iv)

respective weights for the differential coefficients and the sum coefficient, and output the determined decoded value.

20. A non-transitory computer readable storage medium having stored thereon an integrated circuit definition dataset that, when processed in an integrated circuit manufacturing system, configures the integrated circuit manufacturing system to manufacture a decoding unit, the decoding unit being configured to decode a compressed data structure to determine a decoded value in accordance with system parameters in a computer system, wherein the compressed data structure encodes a set of Haar coefficients for a block of pixels, wherein the set of Haar coefficients comprises a plurality of differential coefficients and a sum coefficient, wherein a first portion of the compressed data structure comprises a set of exponent bits representing exponents for the differential coefficients, a second portion of the compressed data structure comprises a set of sign bits representing signs for the differential coefficients, and a third portion of the compressed data structure comprises a set of sum bits representing the sum coefficient, wherein the first, second and third portions of the compressed data structure are distinct from each other and wherein the numbers of bits in the first, second and third portions of the compressed data structure are defined based on the system parameters, wherein the system parameters comprise a plurality of configurable system parameters and a plurality of dependent system parameters which are determined based on one or more of the configurable system parameters; and wherein the decoding unit comprises:

an unpacking unit configured to unpack the compressed data structure to identify the set of exponent bits, the set of sign bits and the set of sum bits;

a coefficient decoding module configured to:

use the identified set of exponent bits to determine exponents for the differential coefficients, use the identified set of sign bits to determine signs for one or more of the differential coefficients, and use the identified set of sum bits to determine the sum coefficient; and a decoded value determination module configured to:

determine the decoded value by determining the result of a weighted sum of the differential coefficients and the sum coefficient for the block of pixels using: (i) the determined exponents for the differential coefficients, (ii) the determined signs for said one or more of the differential coefficients, (iii) the determined sum coefficient, and (iv) respective weights for the differential coefficients and the sum coefficient, and output the determined decoded value.

* * * * *